(12) United States Patent
Tulasi et al.

(10) Patent No.: US 8,248,958 B1
(45) Date of Patent: Aug. 21, 2012

(54) REMOTE VALIDATION OF NETWORK DEVICE CONFIGURATION USING A DEVICE MANAGEMENT PROTOCOL FOR REMOTE PACKET INJECTION

(75) Inventors: Vinuth Tulasi, Bangalore (IN); Pradeep H. Krishnamurthy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 286 days.

(21) Appl. No.: 12/634,465

(22) Filed: Dec. 9, 2009

(51) Int. Cl.
*H04L 12/26* (2006.01)

(52) U.S. Cl. ........................ 370/250; 370/241

(58) Field of Classification Search ................ 370/241, 370/252, 253, 254, 250; 709/220–226; 726/22–24; 717/124
See application file for complete search history.

(56) References Cited

U.S. PATENT DOCUMENTS

| | | | |
|---|---|---|---|
| 7,062,546 | B1 | 6/2006 | Kolar et al. |
| 7,483,379 | B2 * | 1/2009 | Kan et al. ...................... 370/237 |
| 2007/0192448 | A1 * | 8/2007 | Sankaran ...................... 709/220 |
| 2008/0010665 | A1 * | 1/2008 | Hinton et al. ...................... 726/1 |
| 2008/0082661 | A1 * | 4/2008 | Huber ........................... 709/224 |
| 2009/0122805 | A1 * | 5/2009 | Epps et al. ..................... 370/417 |
| 2009/0201807 | A1 * | 8/2009 | Bugenhagen ................. 370/230 |
| 2011/0131324 | A1 * | 6/2011 | Chaturvedi et al. ........... 709/225 |
| 2011/0138470 | A1 * | 6/2011 | Davis et al. ..................... 726/25 |

OTHER PUBLICATIONS

U.S. Appl. No. 12/510,062, by Donghua Deng, filed Jul. 27, 2009.
Harrington et al., "An Architecture for Describing Simple Network Management Protocol (SNMP) Management Frameworks," RFC 3411, Dec. 2002, 60 pages.
Enns, "NETCONF Configuration Protocol," RFC 4741, Dec. 2006, 89 pages.
Juniper Networks, "Juniper Networks Network and Security Manager Administration Guide Release 2009.1, Revision 2" Jan. 18, 2010, 1,023 pp. http://www.juniper.net/techpubs/software/management/security-manager/nsm2009.1/nsm-admin-guide.pdf.
Juniper Networks, "DMI Solution Guide for Juniper Networks Secure Access Platforms," undated, 87 pp. http://www.juniper.net/techpubs/software/ive/6.x/guides/6.5-dmi-solution-guide.pdf.
Juniper Networks, "Juniper Networks Network and Security Manager Administration Guide Release 2009.1, Revision 1," Aug. 24, 2009, 1,001 pp.

* cited by examiner

*Primary Examiner* — Gary Mui
(74) *Attorney, Agent, or Firm* — Shumaker & Sieffert, P.A.

(57) ABSTRACT

In general, this disclosure describes techniques for testing and verifying the functionality of networks and network devices without requiring the deployment of specialized testing components. For example, as described herein, a device management protocol (e.g., SNMP or NETCONF) typically used for remote configuration of devices has been extended to allow traffic patterns to be seamlessly injected into the existing network devices that form the enterprise network. For instance, a network management device sends configuration data to a managed network device in accordance with a device management protocol and calls, using a test packet parameter, a device configuration function exposed by a managed device. When the device configuration function is called, the managed device processes the test packet to produce a result in accordance with the configuration data as if the test packet had been received from the network, and the managed device returns a test packet processing result.

20 Claims, 11 Drawing Sheets

REMOTE VALIDATION OF NETWORK DEVICE CONFIGURATION USING A DEVICE MANAGEMENT PROTOCOL FOR REMOTE PACKET INJECTION

TECHNICAL FIELD

The invention relates to computer networks, and, more particularly, to remotely injecting computer network packets into network devices.

BACKGROUND

A packet-based computer network is a group of network devices, such as routers, switches, endpoint devices, and servers, which are interconnected in such a manner as to permit the exchange of network packets between any two or more of the network devices. Large enterprises may operate computer networks that include hundreds or even thousands of geographically distributed network devices. Subnets within an enterprise frequently have particular functional requirements relating to, for example, access control and quality of service (QoS). The continual increase in size and complexity of computer networks has similarly increased the challenge of managing, configuring and verifying the operation of the computer network and the devices within the network. Moreover, an improperly configured network device may leave the enterprise system vulnerable to network security threats. These network vulnerabilities, when combined with the topological and functional complexity of the enterprise, multiply the anxieties of system administrators seeking to protect and ensure the desired operation of the enterprise network.

Conventional methods for testing the operation of an enterprise network and the proper configuration of individual network devices in the network include distributing network analysis components to strategic locations within the enterprise. Administrators assign tasks to the components, such as directing the components to operate as source nodes on the network to generate particular traffic patterns. Other components installed as nodes on the network operate as distributed packet sniffers to capture the packets traversing the network. Administrators then typically use a packet analyzer to decode the packets to understand the behavior and characteristics of the traffic. In effect, such methods provide a high-level understanding of the network's handling of traffic but provides limited ability of the administrator to confirm the proper configuration of individual network devices. In addition, provisioning and deploying a network analysis system including its various components can be expensive and cumbersome.

SUMMARY

In general, this disclosure describes techniques for testing and verifying the functionality of networks and network devices without requiring the deployment of specialized testing components. For example, as described herein, a device management protocol (e.g., SNMP or NETCONF) typically used for remote configuration of devices has been extended to allow traffic patterns to be seamlessly injected into the existing network devices that form the enterprise network. That is, rather than deploying traffic generators to strategically introduce traffic patterns into various points of the network, the desired traffic patterns are encapsulated and communicated to the existing network devices of the network via the management protocol that would otherwise be used to manipulate configuration data of the network devices. Enhanced device management software within the network devices decapsulates the traffic patterns and processes the traffic (e.g., applying filtering and forwarding policies) as if the traffic were "live" traffic "on the wire" within the enterprise network. However, rather than outputting any resultant traffic onto the network after processing, the network devices encapsulate the resulting traffic and return the traffic by way of the device management interface for inspection and analysis.

For example, an administrator for the network devices in an enterprise uses a device management system to interface with, manage, and test the behavior of the network devices. In the normal course, the administrator interacts with the device management system to specify and install configuration data within the network devices to configure within the network the network devices according to a desired operational scheme. For example, a network device may be configured to accord with certain policies, which may include security, routing, filtering and QoS policies, network address translation (NAT) rules, access control policies, and other configuration data. A particular policy typically includes one or more rules that specify a condition and action that cause the network device to handle a network packet in a certain way. After configuring the network device, the administrator interacts with the same device management system to test the network device as described herein to ensure that the configured network device achieves the intended objectives of the administrator.

In one example, the enhanced network management software on the network device exposes one or more remote procedure calls (RPC) that accept network packets as a parameter. The administrator uses the device management system to generate packets that validate the efficacy of the policy rules or other configuration data of the network device and then inject the packets directly into the network device via the exposed RPC of the network management protocol. The network device receives the packets as an RPC parameter, unwraps the packets and conveys the packets to its processing engine, which applies the appropriate policies to the packets and determines the corresponding packet handling actions as if the packets were live and received directly from its network interface. In this way, the network device processes the packets and determines any packet handling actions that the device would normally take, such as modifying the packets, forwarding the packets via a certain interface, or dropping the packets. The network device encapsulates an account of the resulting action into an RPC-reply, which may include a parameter specifying one or more packets that would have been produced, i.e., output, by the network device, and returns the account to the device management system for analysis.

In one embodiment, the invention is directed to a network management device comprising a network interface configured to receive and send network packets and an element manager configured to send configuration data to a managed network device in accordance with a device management protocol. The network management device further comprises a device management software interface client configured to implement the device management protocol and to call a device configuration function exposed by the managed network device that receives a test packet encapsulated as a first parameter of the device configuration function, wherein the test packet simulates one or more of the network packets, wherein the element manager includes a validation module that generates a test packet and invokes the device configuration function using the test packet as a first parameter.

In another embodiment, the invention is directed to a network device comprising a control unit and a network interface configured to receive and send network packets. The network device additionally comprises a device configuration manager executing on the control unit of the network device to receive configuration data in accordance with a device management protocol and to update configuration data of the network device. The network device further comprises a device management software interface configured to implement the device management protocol and to expose a device configuration function that receives a test packet encapsulated as a first parameter of the device configuration function, wherein the test packet simulates one or more of the network packets. The device configuration manager of the network device includes a packet processing module that extracts the test packet and processes the test packet to produce a test packet processing result in accordance with the configuration data of the network device as if the test packet had been directly received from the network, and wherein the device management interface is configured to send the test packet processing result as a first parameter of a reply message in accordance with the device management protocol.

In another embodiment, the invention is directed to a system comprising a network management device itself comprising a network interface configured to receive and send network packets and an element manager configured to send configuration data to a managed network device in accordance with a device management protocol. The network management device further comprises a device management software interface client configured to implement the device management protocol and to call a device configuration function exposed by the managed network device that receives a test packet encapsulated as a first parameter of the device configuration function, wherein the test packet simulates one or more of the network packets, wherein the element manager includes a validation module that generates a test packet and invokes the device configuration function using the test packet as a first parameter.

The system further comprises a network device managed by the network management device, comprising a control unit and a network interface configured to receive and send network packets. The network device further comprises a device configuration manager executing on the control unit of the network device to receive configuration data in accordance with the device management protocol and to update configuration data of the network device. In addition, the network device comprises a device management software interface configured to implement the device management protocol and to expose the device configuration function called by the network management device, wherein the device configuration manager includes a packet processing module that extracts the test packet and processes the test packet to produce a test packet processing result in accordance with the configuration data of the network device as if the test packet had been directly received from the network. In this embodiment, the device management interface is configured to send the test packet processing result as a first parameter of a reply message in accordance with the device management protocol. In addition, the validation module of the network management device is further configured to determine whether the test packet processing result indicates that the network device is properly configured.

In another embodiment, the invention is directed to a method comprising the steps of invoking a first device configuration function, exposed by a first network device, that receives a first test packet as a parameter, wherein the first test packet simulates a network packet that may be received at a network interface of the first network device. The method additionally comprises the steps of receiving a first reply message comprising a first result packet in response to invoking the first device configuration function, and determining whether the first network device is properly configured based on the first result packet.

The techniques of this disclosure may provide one or more advantages. For example, the techniques allow a system administrator to remotely configure and then validate policies or other configuration data of a network device without having to deploy and rely on distributed network analysis tools. As a result, device management and verification may be centralized. In addition, rather than deploying remote packet analyzers to monitor the behavior of network devices, the account of the packet handling actions taken by a device in response to specific network traffic may be encapsulated directly into a reply via the device management protocol, which allows the device management system to easily consolidate and synchronize analysis data. In some embodiments, the account of the packet handling actions specifies the particular policy rules that produced the actions. Identifying the applied rules permits the administrator to manage the network devices and identify misconfiguration as more than a mere abstraction. As another example, the techniques may be used as a network diagnostic tool. Packets received in an RPC-reply from one existing network device may be analyzed and then relayed, by the device management system via the extended device management protocol, to a second existing device at a different location within the network, e.g., along a particular network route. The second device responds to the device management system with a second RPC-reply containing its hypothetical response to the network traffic, and the administrator may continue remotely testing devices along the network route until the device management system determines the particular device that is interfering with a desired network operation. In this way, policies and configuration data affecting the operation of network devices forming the topology of a network may be tested and verified against specific traffic patterns without introducing the traffic or resultant traffic into the network, so called, "on the wire."

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9 is an exemplary XML-schema that defines the name and parameters for an RPC operation implemented according to the techniques of the invention.

FIG. 10 is an exemplary XML-schema that defines the name and parameters for a RPC-reply for an RPC operation implemented according to the techniques of the invention.

DETAILED DESCRIPTION

Figure 1:
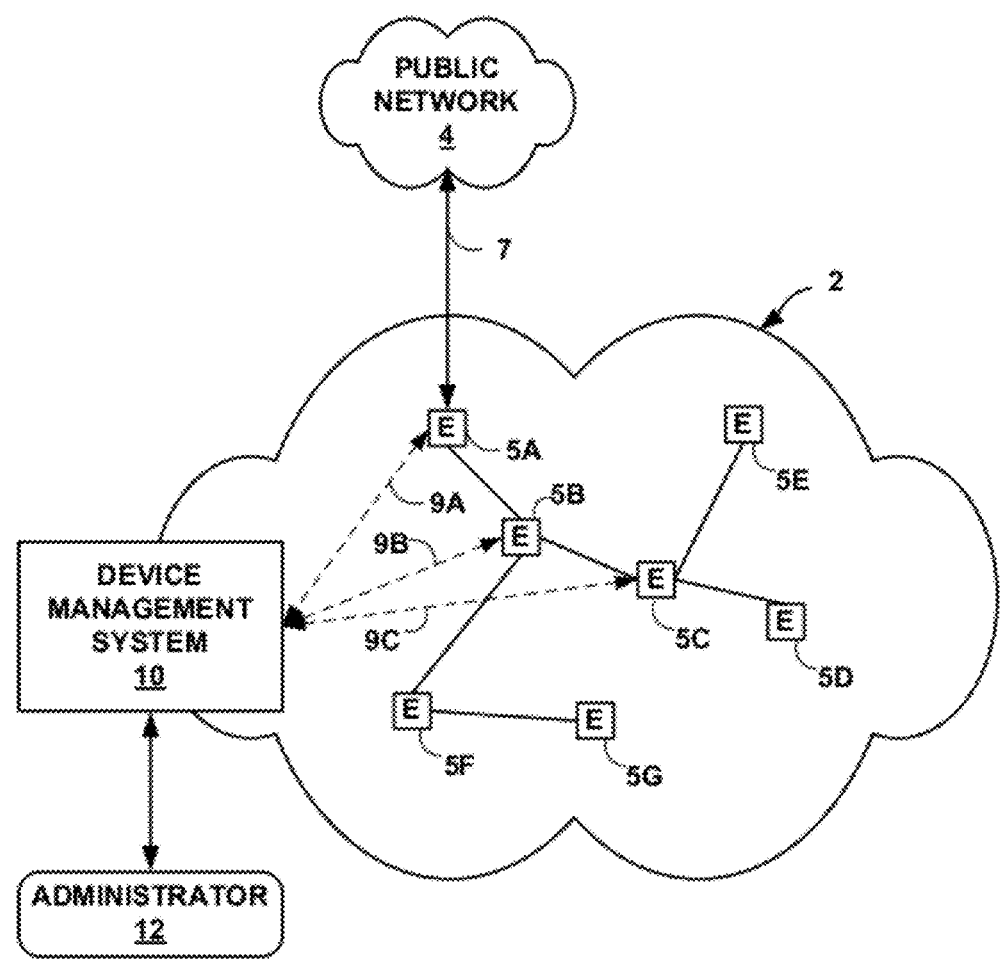
FIG. 1 is a block diagram illustrating enterprise elements managed with a device management system according to the techniques of the invention.

FIG. 1 is a block diagram illustrating elements of an enterprise network 2 that are managed using a device management system 10. Managed elements 5A-5G (collectively, "elements 5") of enterprise network 2 are existing network devices interconnected via communication links to form a communication topology in order to exchange resources and information. Elements 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 5 may be physical links (e.g., optical, copper, and the like) or wireless.

Enterprise network 2 is shown coupled to public network 4 (e.g., the Internet) via communication link 7. Public network 4 may include, for example, one or more client computing devices. Public network 4 may provide access to web servers, application servers, public databases, media servers, end-user devices, and other types of network resource devices and content. Network devices in public network 4 may present a number of security threats to enterprise network 2. For example, devices in public network 4 may attempt to deliver worms, trojans, and/or viruses to one or more of elements 5. As another example, a hacker using a device in public network 4 may attempt to infiltrate enterprise network 2 to snoop, corrupt, destroy, or steal information stored by one or more of elements 2.

Device management system 10 is communicatively coupled to elements 5 via enterprise network 2. Device management system 10 may be coupled either directly or indirectly connected to the various elements 5. Once elements 5 are deployed and activated, administrator 12 may use device management system 10 to manage the network devices using a device management protocol. One example device protocol is the Simple Network Management Protocol (SNMP) that allows device management system 10 to traverse and modify management information bases (MIBs) that store configuration data within each of managed elements 5. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, the entire contents of which are incorporated herein by reference.

In common practice, device management system 10 and elements 5 managed by device management system 10 are centrally maintained by an IT group of the enterprise and are collectively referred to as an element management system (EMS) or a network management system (NMS). Administrator 12 interacts with device management system 10 to remotely monitor and configure elements 5. For example, administrator 12 may receive alerts from device management system 10 regarding any of elements 5, view configuration data of elements 5, modify the configurations data of elements 5, add new network devices to enterprise network 2, remove existing network devices from enterprise network 2, or otherwise manipulate the enterprise network 2 and network devices therein. Although described with respect to an enterprise network, the techniques of this invention are applicable to other network types, public and private, including LANs, VLANs, VPNs, and the like.

Administrator 12 uses device management system 10 to configure elements 5 to specify certain operational characteristics that further the objectives of administrator 12. For example, administrator 12 may specify for an element 5 a particular operational policy regarding security, device accessibility, traffic engineering, quality of service (QoS), network address translation (NAT), packet filtering, packet forwarding, rate limiting, or other policies. Device management system 10 uses a network management protocol designed for management of configuration data within managed network elements 5, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in R. Enns et al., RFC 4741: "NETCONF Configuration Protocol," Network Working Group, the Internet Engineering Task Force draft, December 2006, which is incorporated herein by reference in its entirety. Device management system 10 may establish NETCONF sessions with one or more of elements 5. In the example of FIG. 1, device management system 10 participates in NETCONF sessions 9A-9C with elements 5A-5C, respectively.

In the example of FIG. 1, device management system 10 extends NETCONF to provide a mechanism for testing and verifying the functionality of network elements 5 without requiring the deployment of specialized testing components within network 2. For example, device management system 10 uses the device management protocol (e.g., SNMP or NETCONF) to remotely configure elements 5 and extends the device management protocol to allow traffic patterns to be seamlessly injected into the existing network elements 5 that form the enterprise network 2. Enhanced device management software within each of network elements 5 decapsulates the traffic patterns for processing by the elements (e.g., applying filtering and forwarding policies) as if the traffic were "live" traffic "on the wire" within enterprise network 2. However, rather than outputting any resultant traffic onto the network after processing, network elements 5 encapsulate any resulting traffic and return the traffic by way of the device management protocol for inspection and analysis by device management system 10.

For example, after modifying the configuration data of element 5A to implement a given operational objective, e.g., by installing configuration data specifying a policy to drop packets received from a particular network source, device management system 10 may further automatically generate appropriate simulation packet data effective for testing the operational objective using the same device management interface. Device management system 10 then delivers this packet data to the packet injection mechanism of the enhanced device management protocol, which encapsulates and transmits the packet data to element 5A via enterprise network 2 as one or more device management requests, e.g., using NETCONF-based messages. Element 5A receives the device management requests, extracts the embedded traffic and applies the appropriate policies to the packet data as if the traffic were "live" traffic. Element 5A then generates a response message for device management system 10 that includes a data structuring containing an account (i.e., a result) of the application of the device policies. In some embodiments, the account may include a sequence of packets that would have be sent, according to an ordinary operation of element 5A, in response to the packet data received from device management system 10. In this manner, device management system 10 may perform a semantic validation of policies as configured on one or more of elements 5.

Figure 2:
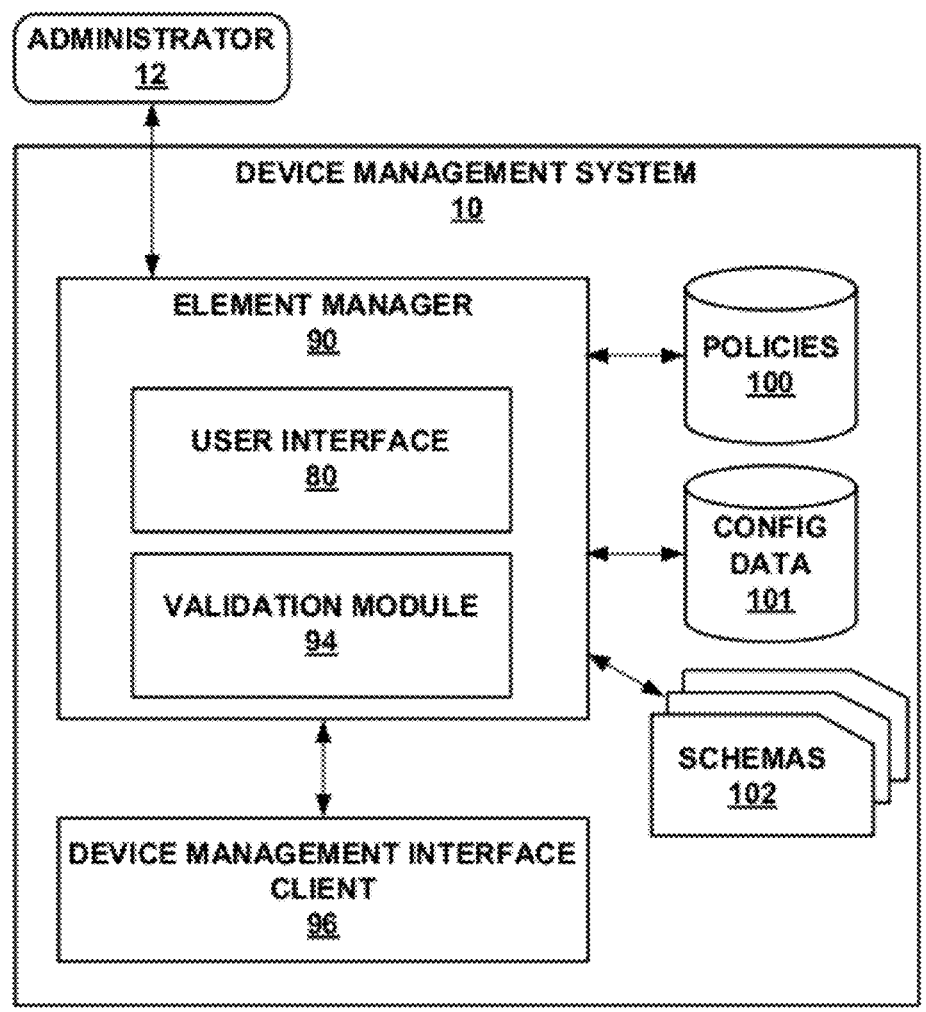
FIG. 2 is a block diagram illustrating an example device management system that is modified to enable validation of policies and other configuration data in accordance with the disclosures herein.

FIG. 2 is a block diagram illustrating device management system 10 in further detail. In this example, administrator 12 interacts with device management system 10 via user interface 80 to locally maintain and modify configuration data 101 and network device policies 100, and to install the configuration data and policies to the appropriate network device using the enhanced device management protocol described herein. Device management system 10 includes databases of device policies 100 and configuration data 101 that store and maintain policies and configuration data, respectively, for managed elements 5 of enterprise network 2. In some embodiments, device policies 100 are stored within a separate policy server (not shown) and device management system 10 queries the policy server to update, retrieve, and manage the policies. Device policies 100 may maintain policies 100 and configuration data 102 in an XML-based encoded database. However, in some embodiments, device policies 100 may maintain policy configuration data in the form of one or more tables, linked lists, databases, flat files, or any other data structure. Policies 100 may include policies for a number of different policy areas, e.g., security, routing, and QoS. Examples of configuration data for network devices that process and forward network traffic are shown in U.S. Pat. No. 7,062,546, the content of which is incorporated herein in its entirety. Further details on management systems and the application of schemas for verification of configuration data are found in U.S. application Ser. No. 12/510,062, the entire contents of which is incorporated herein.

In general, a policy is a set of one or more rules that specify conditions as well as corresponding actions that cause a network device to operate in a particular manner upon satisfaction of the condition. Conditions may define match conditions for packets and packet flows within enterprise network 2. A condition may apply to any level of Open Systems Interconnect (OSI) model or the Transmission Control Protocol/Internet Protocol (TCP/IP) model. For example, a condition may match a particular transport protocol or layer-two (L2) parameters (e.g., source or destination port), a particular network protocol or layer three (L3) parameters (e.g., source or destination network address, a packet length, header information), an application protocol or application-layer (L7) parameter or pattern (e.g., a specific HTML pattern within the payload data to detect malicious byte sequences) and various other packet classifications. Conditions may also be interface-specific, such as by specifying specific physical or logical interfaces on which to apply the policies. Corresponding actions for the network device to perform upon occurrence of a condition concern the action the network device takes with respect to the packet or packet flow. These may include, e.g., filtering, forwarding, rate limiting, assigning to a forwarding class, mirroring for traffic analysis, and the like.

Element manager 90 provides methods for managing a network of devices, such as enterprise network 2. During a NETCONF session with a managed device, for example, element manager 90 exchanges configuration-related data 101 with the managed device. An administrator 12 may interface with element manager 90 directly in order to perform policy and configuration management tasks. In some instances, element manager 90 automatically performs such tasks (e.g., via scripts) in order to rapidly handle policy-related issues or to relieve the administrative burdens of managing enterprise network 2. For example, element manager 90 may periodically poll elements 5 to determine whether the respective configurations are consistent with the requirements of enterprise network 2. As one example, element manager 90 may require elements 5 to install a recent virus definition for anti-virus software in order to access the resources provided by enterprise network 2. If, in response to a query from element manager 90, an element 5 declares an out-of-date anti-virus definition, element manager 90 may direct a credentialing agent (not shown), such as a Remote Authentication Dial In User Service (RADIUS) server, to revoke the network access credentials of the element 5.

Element manager 90 receives device configuration commands from an administrator or other agent and modifies, as directed, one or more of elements 5 in accordance with the commands. Element manager 90 further updates the configuration data in devices policies 100 upon receipt of device configuration commands to ensure that the configuration data is consistent with the configuration of the corresponding one or more of elements 5. In some embodiments, prior to deploying the configuration data to the managed element, element manager 90 selects and applies an appropriate one of schemas 102 to validate that the configuration data entered by administrator 12 conforms to syntax and semantics published by a manufacturer of the device being managed. If an element 5 were to fail, element manager 90 may push the configuration data to a replacement for the element 5 in order to restore element 5 to the most recent configuration. In some instances, element manager 90 may perform bulk configuration of multiple elements 5. That is, element manager 90 may push a set of policy rules or configuration data sequentially or simultaneously to multiple elements 5 in an automated fashion via enterprise network 2.

In some embodiments, element manager 90 is an extension of the Juniper Networks Network and Security Manager (NSM) application as described in Juniper Networks, "Juniper Networks Network and Security Manager Administration Guide Revision 2009.1," August 2009, which is incorporated herein by reference in its entirety.

In the example of FIG. 2, device management system 10 further includes device management interface client 96 ("DMI client 96") for exchanging messages with elements 5. NETCONF permits server devices, such as elements 5, to expose a full, formal application programming interface (API) to potential client devices. DMI client 96 implements and extends aspects of the NETCONF protocol in order to provide an interface by which element manager 90 participates in a communication session with elements 5. For example, DMI client 96 initiates and maintains connections with an element 5, handles authentication, security, and confidentiality for the connection, determines the supported NETCONF protocol extensions provided by the element 5, receives well-formed data in accordance with the NETCONF protocol for transmission to the element 5, and relays data received from the element 5 and destined for element manager 90. As described in detail with respect to FIG. 3, DMI client 96 extends the client-side of the NETCONF protocol to interface with a server-side extension of the NETCONF protocol that permits management devices, such as device management system 10, to inject packets directly into elements 5.

In accordance with the principles of the invention, element manager 90 includes validation module 94, which injects, via DMI client 96, packets directly into elements 5 via the device management protocol in order to determine whether a policy or configuration data of each of elements 5 meets specific operational objectives for the element. In general, element manager 90 directs validation module 94 to validate all or a subset of the configuration data or policy rules deployed to one or more of elements 5, for example, element 5A. In response, validation module 94 analyzes, for element 5A, the appropriate policy rules stored in device policies 100 in order to determine a packet or sequence of packets that may adequately assess the behavior of element 5A under analysis, as configured with the policy rules being validated, with respect to the intended objectives.

Validation module 94 generates packets in accordance with the above determination and delivers the test packets to DMI client 96, which establishes a NETCONF session with element 5A and then sends the test packets through the server-side NETCONF extension implemented on element 5A in order to remotely and directly inject the test packets into element 5A. As explained herein, the generated test packets may be communicated as parameters of RPC messages of the device management protocol so that the test traffic does not traverse the network as "live" network traffic.

Element 5A receives the messages containing the test packets and responds with reply data encoded according to the requirements of the NETCONF extension. The reply data may include a sequence of zero or more packets that represent the output packets that element 5A would, according the element 5A policy configuration, send out of a network interface in response to receiving the test packets at a network interface. In addition, the reply data may include a network interface identifier that element 5A would use to forward the output packets, as well as the set of policy rules that element 5A applied to the test packets to determine the output packets and outbound network interface.

DMI client 96 relays the reply data to validation module 94, which determines, either automatically or in conjunction with an examination of the reply data by administrator 12, whether the reply data indicates that the set of policy rules being validated accomplishes the intended policy objectives with regard to element 5A. By performing the techniques described above, device management system 10 allows administrator 12 to remotely validate the policies configured on elements 5.

Figure 3:
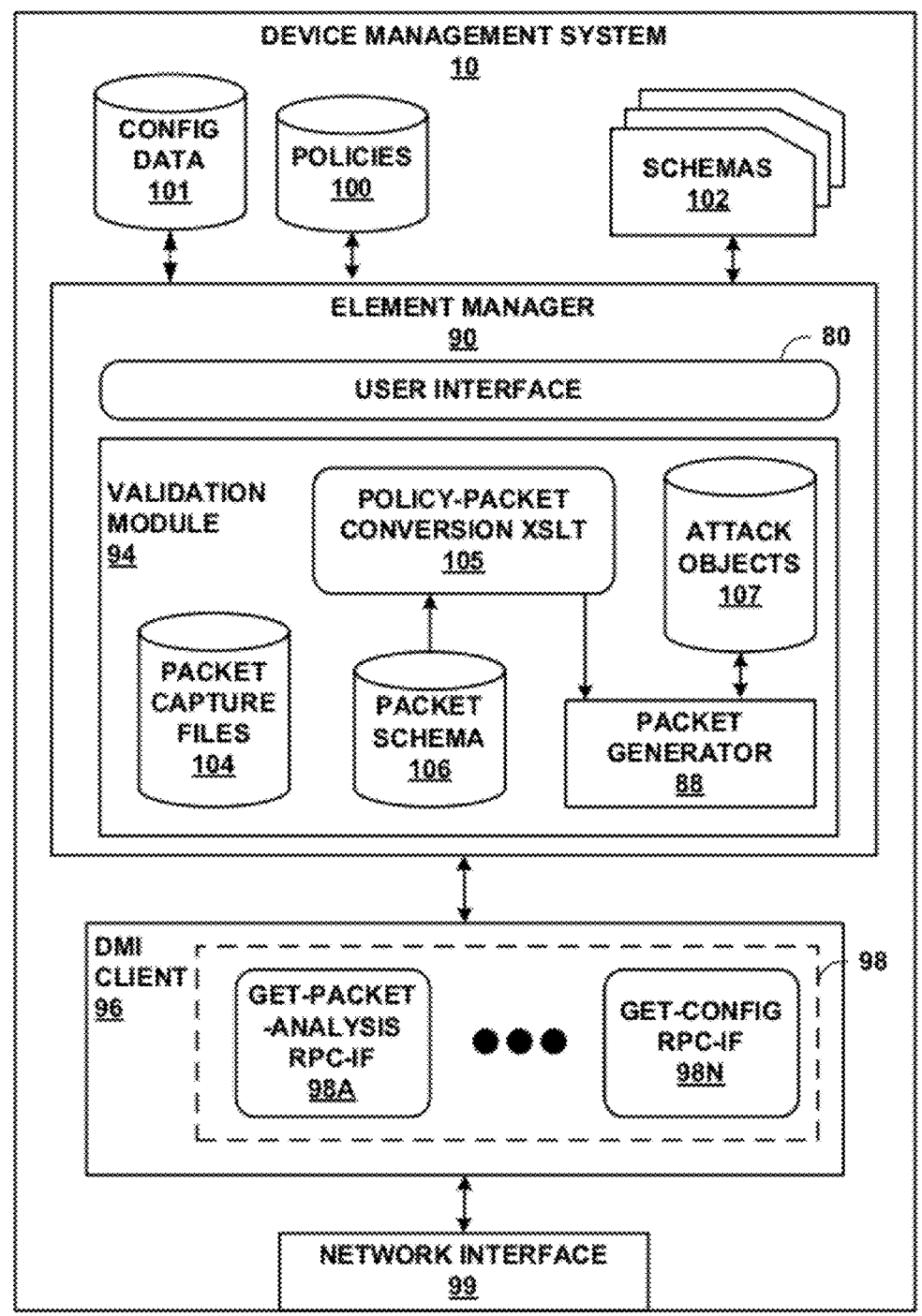
FIG. 3 is a block diagram illustrating the example device management system of FIG. 2 in greater detail.

FIG. 3 is a block diagram illustrating device management system 10 in further detail. Device management system 10 includes user interface 80, which presents a visual or other interface by which administrator 12 may use element manager 90 to manage the elements 5 of enterprise network 2. User interface 80 typically presents visual interfaces that are responsive to user input obtained from peripherals. For example, user interface 80 may comprise a graphical user interface (GUI) or a command line interface. For human-cognizable presentation, user interface 80 may be coupled to a computer monitor, a television, a projector, speakers, or other audio and video output devices (not shown). To receive user input, user interface 80 may be coupled to a keyboard, a mouse, or other peripherals. In some embodiments, user interface 80 comprises the user interface for Juniper Networks NSM.

As described above, device management system 10 comprises device schemas 102, which includes a device-specific schema for each of the elements 5 managed by device management system 10. Element manager 90 uses known schemas (e.g., extensible markup language (XML) schemas typically in the form of XML Schema Definition (XSD) documents) that specify the proper means for interacting with and configuring elements 5 in order to manage policy configurations for elements 5. Further information on XML documents and XSD documents can be found in Extensible Markup Language (XML) 1.0 (Fifth Edition), W3C Recommendation 26 Nov. 2008, and XML Schema Part 1: Structures Second Edition, W3C Recommendation 28 Oct. 2004, respectively, the entire contents of both are incorporated herein by reference.

The schemas in device schemas 102 are typically supplied by the manufacturer of a managed device, such as one of elements 5, and are generally stored as flat files or databases, though they may in some instances be stored as another data structure. In some embodiments, device management system 10 obtains policy schemas from a remote storehouse, such as the Juniper Networks Schema Repository, a publicly accessible resource that is updated with each network device release. The Juniper Networks Schema Repository enables access to XSD and XML files defined for each network device, model, and software version. In such embodiments, device management system 10 may cache a copy of the appropriate schemas for elements 5 within device schemas 102.

In general, an XML-based device schema for a managed device specifies appropriate syntactical structure for XML configuration files that, when produced by element manager 90 in compliance with the schema, will be received and understood by the corresponding managed device so as to configure the managed device. For example, a schema may be used to describe to element manager 90 the elements and attributes that can properly be present within the XML configuration file for that configuration file to be considered valid for a given managed device in view of the specifications of the device, the functions provided by the device, the network requirements for configuration of the device such as an Internet protocol (IP) address and hostname for the device, and mechanisms by which element manager 90 interacts with the managed device.

Device management system 10 further includes network interface 99, which may comprise, e.g., a network interface card having an Ethernet interface. Network interface 99 is communicatively coupled to elements 5 via communication links.

As described above, in one example, DMI client 96 communicates with elements 5 according to the NETCONF protocol and extensions thereof. The NETCONF protocol uses a Remote Procedure Call (RPC) paradigm—the NETCONF protocol operations (i.e., the individual RPCs) are realized on top of a simple RPC layer. The RPC layer is layered on a transport protocol, e.g., SSH or SSL, with a transport session initiated and maintained by DMI client 96, as described with respect to FIG. 2.

In one example, managed devices include a server that exposes RPCs for performing various operations associated with device management. For example, the baseline operations for the NETCONF protocol, i.e., those functions that any NETCONF capable device must support, include get, get-config, edit-config, copy-config, delete-config, lock, unlock, close-session, and kill-session, each of which is described in detail in R Enns et al., RFC 4741: "NETCONF Configuration Protocol," incorporated supra.

In one example, DMI client 96 supports remote procedure call interfaces 98A-98N (collectively, "RPC-IF s 98"), which provides interfaces to corresponding RPCs supported by elements 5. RPC-IFs 98 accept, as parameters, configuration or other data and generate RPC requests for transmission to elements 5. The name and parameters of an RPC are encoded as the contents of an <rpc> element. The name of the RPC is an element directly inside the <rpc> element, and any parameters are encoded inside this element. Therefore, upon receiving parameters, an RPC-IF 98 encloses the parameters first in the appropriate XML tag that specifies the name of the RPC-IF 98, e.g. <get-config>, and then encloses the resulting operation XML-element in an <rpc> tag. Additional details for generating proper operation and <rpc> XML-elements may be found in R. Enns et al., RFC 4741: "NETCONF Configuration Protocol," incorporated supra.

Device management system 10 employs element manager 90, DMI client 96, and RPC-IFs 98 in order to configure an element 5, e.g., element 5A, as follows. Provided a particular management task to perform on element 5A (e.g., in response to a command received from an administrator), element manager 90 retrieves the schema for element 5A from device schemas 102 and applies the schema to the parameters of the management task to generate well-formed XML policy configuration data tailored to element 5A. Element manager 90 additionally selects the appropriate one of RPCs 98 for performing the task. In some instances, element manager 90 generates well-formed XML policy configuration data by applying a transformation script, such as an Extensible Stylesheet Language Transformations (XSLT) stylesheet, to the element 5A device policy configuration stored by device policies 100. In such instances, the XSLT stylesheet transforms the XML-based device policy configuration to the appropriate device policy schema, retrieved from device schemas 102, for element 5A.

Element manager 90 then provides the configuration data and/or one or more policies to the selected RPC-IF 98, which encloses the configuration data and/or policies in the appropriate XML tags and sends the RPC request to element 5A using the secure, connection-oriented session managed by DMI client 96. Element 5A responds to the selected RPC-IF 98 with an RPC-reply also encoded in XML.

The following exemplifies an RPC request specifying an edit-config operation to delete the configuration for an interface on element 5A and further exemplifies a resulting RPC-reply received in response. The NETCONF protocol carries configuration data inside the <config> element that is specific to the element 5A device policy schema as specified in device schemas 102. The NETCONF protocol treats the contents of the <config> element as opaque data.

```
<rpc message-id="101"
xmlns="urn:ietf:params:xml:ns:netconf:base:1.0">
<edit-config>
<target>
    <running/>
</target>
<default-operation>none</default-operation>
<config xmlns:xc="urn:ietf:params:xml:ns:netconf:base:
    1.0">
    <top xmlns="http://example.com/schema/1.2/config">
        <interface xc:operation="delete">
            <name>Ethernet0/0</name>
        </interface>
    </top>
</config>
</edit-config>
</rpc>
```

```
<rpc-reply message-id="101"
xmlns="urn:ietf:params:xml:ns:netconf:base:1.0">
<ok/>
</rpc-reply>
```

In some embodiments, the schemas for the RPC request and RPC-reply may differ from the schema used to generate the elements exemplified above. For example, the schemas may comport with schemas for the Juniper Networks Device Management Interface, as described in Juniper Networks, "DMI Solution Guide for Juniper Networks Secure Access Platforms," undated, which is incorporated herein by reference in its entirety.

As described above in the description of FIG. 2, element manager 90 manages the configurations of elements 5 on enterprise network 2 and comprises validation module 94, which determines whether the configuration, including deployed policies, of each of elements 5 meets specific operational objectives for the element.

In accordance with the techniques described herein, DMI client 96 extends NETCONF to support get-packet-analysis RPC-IF 98A (hereinafter, "packet analysis interface 98A"), an additional interface for a corresponding RPC operation supported by elements 5. Packet analysis interface 98A to perform functions similar to those described above with respect to RPCs 98 generally. That is, packet analysis interface 98A receives parameters, encloses those parameters in the necessary XML tags, and sends the resulting RPC request to one of elements 5. Rather than being used for device configuration, however, packet analysis interface 98A allows device management system 10 to inject packets directly into a managed device by way of an RPC request and to receive, via an RPC-reply, an account of the policies applied.

Packet analysis interface 98A accepts as parameters a sequence of one or more test packets encoded in a Base64 encoding, as well as a source interface, which specifies an interface on the managed device. The test packets simulate a packet flow to the managed device (e.g., a packet flow for a File Transfer Protocol (FTP) session). As described in detail with respect to FIGS. 4 and 5, the managed device assumes that test packets received as a parameter of packet analysis interface 98A are received at the interface specified. Packet analysis interface 98A encodes the test packets in Base64 encoding to facilitate a plain-text representation and transfer of binary packet data within the XML-based RPC. Base64 encoding encodes binary data by translating it into a base 64 representation of the numeric value of the binary data.

Packet analysis interface 98A may convert the parameters to an XML-based representation according to an XML schema for packet analysis interface 98A, e.g., the schema illustrated in FIG. 9. Like other RPC-IFs 98, packet analysis interface 98A may enclose the XML-based representation of the parameters first in the appropriate XML tag, <get-packet-analysis>, that specifies the name of the RPC 98, and then encloses the resulting XML-element in an <rpc> tag. The following is an exemplary RPC request generated by packet analysis interface 98A:

```
<rpc message-id="101"
xmlns="urn:ietf:params:xml:ns:netconf:base:1.0">
<get-packet-analysis>
<packets>
    <packet>yZWFzb24sIGJ1dCBie</packet>
    <packet>W55IGNhcm</packet>
</packets>
<source-interface>ge-0/0/0.1</source-interface>
</get-packet-analysis>
</rpc>
```

Upon generating the RPC request, packet analysis interface 98A sends the RPC request to the managed device via a NETCONF session established by DMI client 96.

Validation module 94 comprises packet generator 88, which formulates the test packets for transmission, via packet analysis interface 98A, to an element 5. Packet generator 88 receives input that conforms to packet schema 106, which comprises an XML schema that describes the various fields and patterns for a stream of output packets. For example, packet schema 106 may include XML-elements for source Internet Protocol (IP) address, destination IP address, transport layer protocol, transport layer port, and application protocol/service. In addition, to test the deep packet inspection-related policies (e.g., flagging/dropping packets that contain worms, trojans, intrusions, and spam) of elements 5, packet schema 106 may include XML-elements for identifying known attacks. The identifier, such as the name of worm, maps to an object in attack objects 107, a repository for various byte sequences that are signatures of known attacks. An attack may be identified based on a byte sequence that the attack is known to include (i.e., an attack signature). Packet generator 88 transforms the XML-based input into a sequence of one or more test packets that conform to a protocol (e.g., IP or Ethernet) used by elements 5 communicating across enterprise network 2.

In response to input from an administrator, or as part of an automated scheme, element manager 90 directs validation module 94 to validate all or a subset of the data and policy rules configured on one of elements 5, e.g., element 5A. Device configuration Element manager 90 retrieves the policy rules to be validated from the one of device policies 100 corresponding to element 5A and provides the policy rules to validation module 94. Validation module 94 analyzes the policy rules in order to determine the characteristics of a packet or sequence of packets that may adequately assess the behavior of element 5A, as configured with the policy rules being validated, with respect to the intended objectives. Because, in the embodiment of FIG. 3, the policy rules are stored in an XML-based encoding, validation module 94 may use policy-packet conversion XSLT 105 to transform the XML-based policy rules to a sequence of packets described according to the XML schema of packet schema 106, where policy-packet conversion XSLT 105 is an XSLT stylesheet. In other words, validation module 94 uses policy-packet conversion XSLT 105 to identify the XML-elements of the policy rules relevant to forming a packet adequate for validating the policy rules and maps the values of the relevant XML-elements to packet schema 106. In addition to forming the test packets, validation module 94, as part of the transformation process, also identifies whether any policy rule conditions depend on a source interface. If so, validation module 94 associates the relevant source interface identifier with the XML-based packet sequence description. As one example, a particular policy rule may direct a network device to drop all packets received from IP address 55.0.0.1. The rule may be expressed as an XML-element in a device policy configuration as follows:

<policy-rule>
    <action>drop</action>
    <conditions>
        <IP-source>55.0.0.1</IP-source>
    </conditions>
    </policy-rule>

To create the XML-based input to packet generator 88 for this exemplary policy rule, validation module 94 applies policy-packet conversion XSLT 105 to the XML-element to derive the following, simplified XML-element to describe an appropriate test packet:

<packet>
    <attributes>
        <IP-source>55.0.0.1</IP-source>
        <IP-destination></IP-destination>
        <Protocol></Protocol>
        <Port></Port>
    </attributes>
    <source-interface></source-interface>
    </packet>

Validation module 94 performs similar transformations for each of the policy rules to be validated. In some embodiments, device management system 10 stores data in a form that is not XML based. In some embodiments, packet generator 88 accepts parameters that do not conform to an XML-schema. Validation module 94, in such embodiments, consequently employs transformation mechanisms that differ from the conversion described above. For example, validation module 94 may instead use a Structured Query Language (SQL) query to derive packet parameters from a device policy configuration stored as a database.

Packet generator 88 receives the XML-based input from validation module 94 and creates a sequence of one or more test packets based on the values of the input XML-elements. Packet generator 88 also extracts the source-interface that is associated with the test packet sequence. In some embodiments, different source-interfaces may be associated with different packets in the sequence. For inputs that include an XML-element identifying an attack object, packet generator 88 queries attack objects 107 to obtain the byte sequence associated with the attack object and then inserts the byte sequence in the appropriate field in the test packets. After generating the test packets, packet generator 88 relays the test packets and associated source interface identifier to validation module 94.

Validation module 94 passes the test packets and associated source interface to packet analysis interface 98A, which converts these parameters to an XML-based representation and encloses the representation in additional XML tags according to the requirements of the packet analysis interface 98A RPC in the manner described above. Finally, packet analysis interface 98A sends the resulting RPC request to element 5A via a NETCONF session established by DMI client 96.

As described in detail below, element 5A processes test packets received via a NETCONF session in such a manner as to produce resulting output packets identical to those that element 5A would produce in response to receiving the test packets at an inbound interface of element 5A. Element 5A encapsulates these result packets, together with the determined outbound interface for the result packets, in an XML-based RPC-reply to packet analysis interface 98A. In some instances, element 5A may include identifiers for the policy rules applied as well as associated forwarding data in the RPC-reply.

Packet analysis interface 98A, upon receiving the RPC-reply, extracts the result packets, the outbound interface, and any additional associated forwarding data; decodes the result packets from Base64 encoding to binary encoding; and conveys this information to packet validation module 94. Packet validation module 94 analyzes the received information to determine whether, in fact, the result packets indicate that element 5A, as configured, meets the intended operational objectives for element 5A. In some embodiments, re-key validation module 94 displays, for analysis, some or all of the contents of the RPC-reply to administrator 12 via user interface 80.

Validation module 94 may further comprise packet capture files 104. Packet capture files 104 stores result packets received in an RPC-reply in response to a particular set of test packets generated to test certain corresponding policy rules. Result packets stored in packet capture files 104 are the result packets that administrator 12 expects to receive in response to the test packets for the corresponding policy rules when the one of elements 5 under analysis is operating as intended. Comparing result packets stored in packet capture files to newly received result packets allows validation module 94, after element manager 90 modifies one of elements 5, to quickly verify that the newly modified one of elements 5 is operating as expected with respect to the corresponding policy rules.

In some embodiments, validation module 94 may utilize packet capture files 104 as a repository of test packets. That is, validation module 94 may store, as test packets, packets that represent past network attacks on enterprise network 2. Upon updating the policy configurations of any of elements 5, validation module 94 may replay the stored test packets to the updated element 5 to determine whether the updated element 5 properly achieves the intended objectives as respects the past network attack represented by the test packets.

In some embodiments, validation module 94 may store result packets obtained from a network device and use these stored result packets as test packets for another network device. Using this technique, validation module 94 may, for example, validate a series of network devices along a forwarding path to ensure that the network devices are properly configured. This technique is described in further detail with respect to FIG. 5, below.

Figure 4:
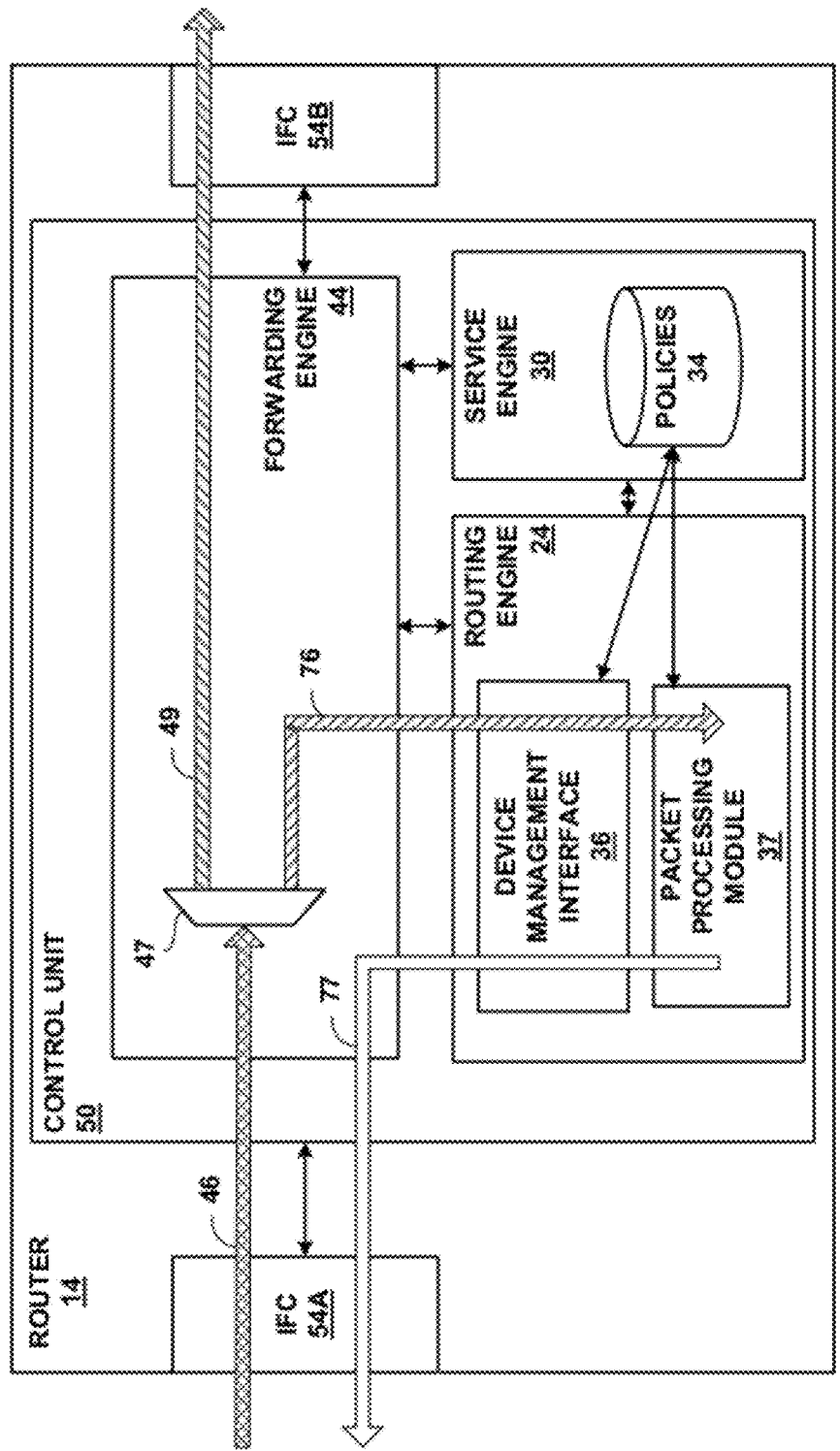
FIG. 4 is a block diagram illustrating an example data flow for packet data received by a router that implements the techniques of the invention.

FIG. 4 is a block diagram illustrating the data flow for packet data received by a router 14 that implements the techniques of the invention. Router 14 represents one of elements 5 of FIG. 1. Although described with respect to a router, the techniques of the invention described below are applicable to other network devices illustrated as elements 5 in FIG. 1.

In this example, router 14 comprises a set of interface cards (IFCs) 54A-54B (collectively, "IFCs 54") for exchanging packets with other network devices. Router 14 further comprises control unit 50, which includes routing engine 24, forwarding engine 44, and service engine 30. In general, routing engine 24 implements routing protocols to exchange routing information with other network devices. Routing engine 24 uses the routing information (illustrated in FIG. 5) to derive forwarding information (illustrated in FIG. 5) for forwarding engine 44. When router 14 receives a packet at one of IFCs 54, forwarding engine 44 determines a destination and associated next hop for the packet based on the forwarding information and outputs the packet on one of IFCs 54 based on the destination. However, forwarding engine 44 flags certain packets destined for router 14 itself (i.e., having a destination address that is assigned to router 14) and redirects the flagged packets to routing engine 24 for additional processing. Forwarding engine 44, for instance, redirects packets carrying configuration management information according to the NETCONF protocol to routing engine 24.

Routing engine 24 includes device management interface 36 ("DMI 36"), which exposes a set of functions by which a remote management device may configure router 14. DMI 36 implements and extends the NETCONF protocol in order to receive commands as well as configuration and other data. Routing engine 24 receives policy configuration data for router 14 from a remote management device via DMI 36, for example, and passes the policy configuration data to service engine 30 for storage in policies 34. Service engine 30 applies services in accordance with the policy rules stored in policies 34 to packets received by router 14.

DMI 36 implements the techniques of the invention by extending NETCONF to expose a packet analysis function that accepts as parameters a sequence of one or more test packets and a source interface for the test packet sequence. DMI 36 receives the parameters when a management device remotely calls the packet analysis function by first establishing a NETCONF session with DMI 36 and then sending a packet analysis function identifier and the parameters to DMI 36 via the established session. Because NETCONF session is layered over certain transport layer protocols that are connection-oriented and provide certain security guarantees, the test packets are therefore received at the application layer. Consequently, packets enter router 14 on different layers. While router 14 receives ordinary packets at IFCs 54 on the data link layer (e.g., Ethernet), the ordinary packets may contain, as part of the payload, encapsulated test packets carried on the application layer as parameters of a NETCONF session. FIG. 4 illustrates this distinction as follows.

Network traffic 46 comprises all packets received by router 14 at IFC 54A. IFC 54A dispatches packets in network traffic 46 to forwarding engine 44. Forwarding engine 44 comprises path selector 47, which analyzes the packets to determine whether the packets carry an IP address associated with routing engine 24. That is, path selector typically comprises a lookup module that traverses a radix tree based on key information extracted from a header of the received packet. If the destination is external to router 14, path selector 47 determines a forwarding next hop and an associated outbound interface and directs the packets to packet stream 49 for forwarding by forwarding engine 44. If the lookup results in a destination of routing engine 24, path selector 47 diverts the packets as packet stream 76 to routing engine 24. Routing engine 24 processes the packet to associate it with an existing TCP/IP-based NETCONF session and forwards the packet to DMI 36, which extracts the application-layer NETCONF data from the packets. Extracted data may include, in accordance with the techniques of the invention, NETCONF messages that contain a sequence of test packets and an associated source interface received as parameters of the packet analysis function exposed by DMI 36 and called by a management device. In such instances, DMI 36 passes the parameters to packet processing module 37 for processing after decoding the test packets from Base64 encoding to binary.

Packet processing module 37 processes the test packets in the manner equivalent to that in which router 14 generally would process packets as if the packets were really received on the wire from the network via the source interface specified in the NETCONF message. In general, packet processing comprises applying routing decision, policy rules, intrusion detection pattern matching or other services offered by router 14 to the packet as if the packet were actually received. Accordingly, packet processing module 37 applies the actions to the test packets and performs certain forwarding functions (e.g., modifying the time-to-live (TTL) field). Application of the policy rules and forwarding functions may cause the test packets to be dropped or modified, any may results in a new sequence of zero or more result packets. The result packets represent the packets that router 14 would ordinarily forward to a neighboring network device if router 14 had received, at one of IFCs 56, packets identical to the test packets delivered as a parameter of the NETCONF message. Packet processing module 37 additionally determines, if necessary, the outbound interface on one of IFCs 56 that router 14 would use to forward the result packets to another network device.

Rather than forwarding the result packets via the outbound interface, however, packet processing module 37 conveys the result packets, as an aspect of packet stream 77, and an identifier for the outbound interface to DMI 36. In some embodiments, packet processing module 37 further conveys an account of the application of the policy rules, which may include a list of the particular policy rules applied or modifications made to the packets (e.g., MPLS labels swapped). DMI 36 returns the information received from packet processing module 37 to the calling management device as the packet analysis function return data. To return the information, DMI 36 encodes the result packets to Base64 encoding and sends the packets and outbound interface identifier as messages within the established NETCONF session. The DMI 36 NETCONF session encapsulates and directs the packets into packet stream 77 for transmission to the calling management device via forwarding engine 44 and IFC 54A.

By encapsulating test packets and processing results in NETCONF messages, the above-described techniques allow a management device to directly inject test packets into router 14 and receive an account of the forwarding functions and policy rules applied by the router 14 to the test packets.

Figure 5:
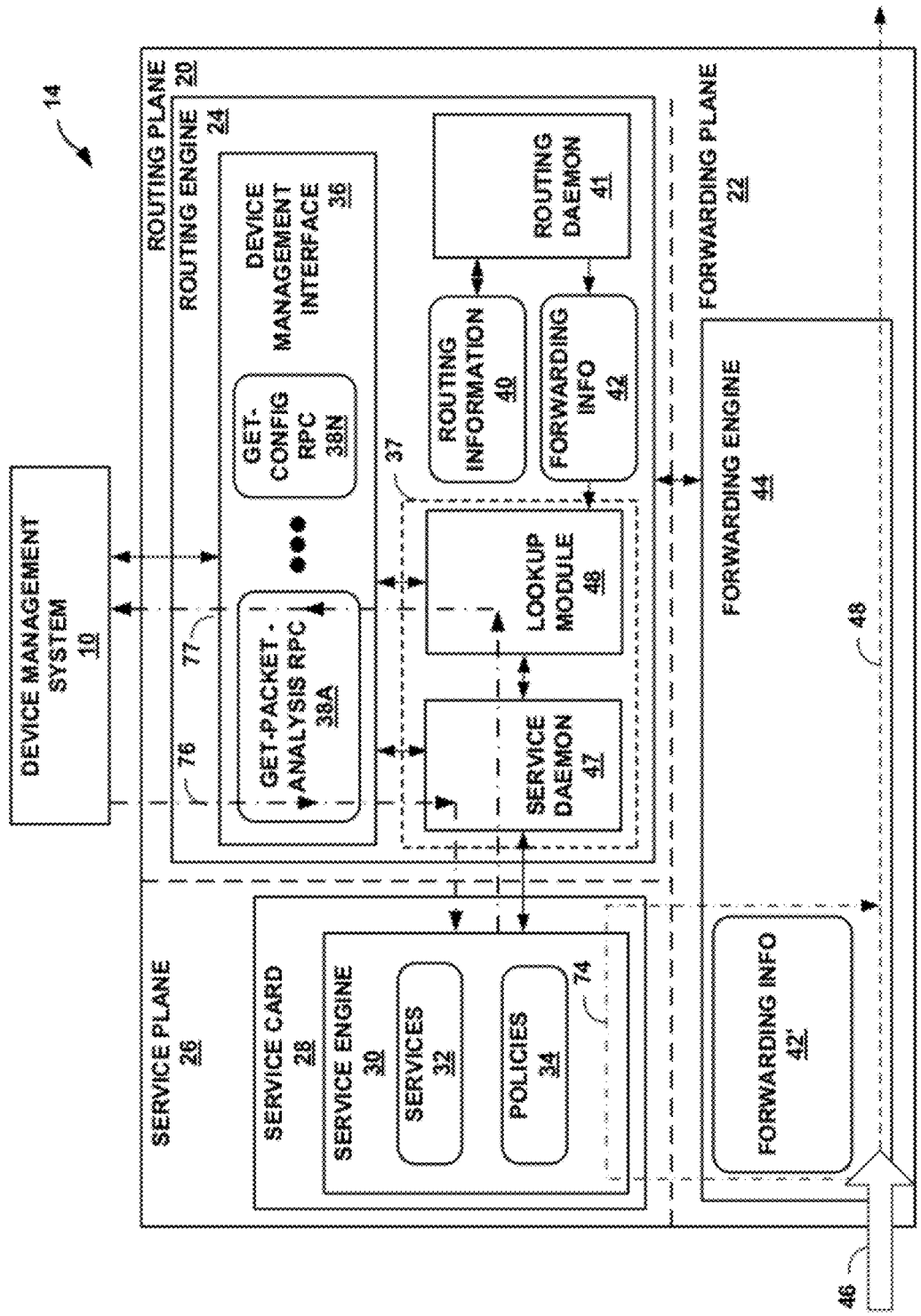
FIG. 5 is a block diagram illustrating the router of FIG. 4 in greater detail.

FIG. 5 is a block diagram illustrating an example of router 14 in greater detail. Router 14 may include a forwarding plane 22, a routing plane 20 and a service plane 26. Router 14 may provide forwarding plane 22 for forwarding network traffic 46 and routing plane 20 for routing network traffic 46. In some instances, forwarding plane 22 may be distributed over a plurality of interfaces or interface cards in a multi-chassis router. In other instances, forwarding plane 22 may be located in a central location, such as a programmable processor or other control unit of router 14. Typically, routing plane 20 resides in this central location, and in instances where forwarding plane 22 resides in the central location, the same programmable processor or other control unit may include or execute both forwarding plane 22 and routing plane 20. Routing plane 20 may, in some embodiments, be distributed over a plurality of processors or components. Router 14 may further provide service plane 26 for applying one or more of a plurality of services 32 to network traffic 46. Service plane 26 may implement the functionality of a network security device as well as other service oriented devices using at least one service card 28. As further examples, service plane 26 may implement such services, represented by services 32, as routing, QoS, NAT, and access control.

Service card 28 may include a service engine 30. Service engine 30 may represent a software and/or hardware component that applies services 32 in accordance with policy rules defined by policy configuration data stored by policies 34, a policy module that stores and maintains policy configuration data for service engine 30 and, by extension, service plane 26. Policies 34 may maintain policy configuration data in an XML-based encoding. However, in some embodiments, policies 34 may maintain policy configuration data in the form of one or more tables, linked lists, databases, flat files, or any other data structure. As one example, a particular policy rule may direct a network device to drop all packets received from IP address 55.0.0.1. The rule may be expressed as an XML-element stored by policies 34 as follows:

<policy-rule>
<action>drop</action>
<conditions>
<IP-source>55.0.0.1</IP-source>
</conditions>
</policy-rule>

Policy configuration data stored by policies 34 may include policies for any of services 32 applied by service plane 26. Although the techniques of the invention are described herein with respect to policies 34 stored within service plane 26, in some embodiments, policies may be stored within or distributed to additional service cards 28, routing plane 20 or forwarding plane 22. For example, in some embodiments, forwarding plane 22 may store one or more policy rules for prompt application by the forwarding elements to network traffic 46.

Routing plane 20 may include a routing engine 24 that resolves routes through enterprise network 2 in accordance with one or more of a plurality of routing protocols. Routing engine 24 may include a device management interface 36 ("DMI 36"), a routing daemon 41, and packet processing module 37. Routing engine 24 is primarily responsible for maintaining routing information 40 to reflect a current topology of enterprise network 2. In addition, routing engine 24 uses routes stored in routing information 40 to compute best paths for particular network destinations and derive forwarding information 42 ("forwarding info 42"), which includes entries that map destination addresses to outbound interfaces on router 14. Routing engine 24 may push a subset of forwarding information 42 to forwarding engine 44 for storage as forwarding information 42'.

Forwarding plane 22 may include a forwarding engine 44. Forwarding engine 44 may represent a software and/or hardware component, such as one or more interface cards (not shown in FIG. 4), that forwards network traffic 46. Forwarding engine 44 may divert aspects of network traffic to 46 as service traffic 74 to service engine 30.

Forwarding engine 44 may represent a central or distributed forwarding engine, where a distributed forwarding engine is distributed across a plurality of interface cards and a central forwarding engine resides in the above described central location, e.g., control unit 50, of router 14. Forwarding engine 44 may forward network traffic 46 in accordance with forwarding information 42' ("forwarding info 42'"). Forwarding information 42' may comprise an association or table of mappings identifying an interface by which to forward a particular packet or data unit of network traffic 46.

DMI 36 may represent a software and/or hardware module that implements and extends aspects of the NETCONF protocol in order to present one or more RPCs 38A-38N ("RPCs 38") with which an administrative device, such as device management system 10, may interact to specify certain operational characteristics of router 14.

DMI 36 cooperates with device management system 10 to initiate a NETCONF session and to handle authentication, security, and confidentiality for the session. In addition, after establishing a session, DMI 36 may advertise, to device management system 10, the set of capabilities that DMI 36 provides in excess of the baseline NETCONF operations (e.g., get-config). RPCs 38 accept, as parameters, configuration or other data as well-formed XML data. As described above, the name and parameters of an RPC are encoded as the contents of an <rpc> element. The name of the RPC is an element directly inside the <rpc> element, and any parameters are encoded inside this element. Therefore, upon receiving RPC request comprising an <rpc> element, DMI 36 determines the name of the RPC 98 being called (e.g., <get-config>) and then feeds the RPC request to the appropriate one of RPCs based on the extracted name.

In response to invocation by device management system 10, RPCs 38 interact with other components of router 14 to retrieve, configure, copy, and/or delete policy configuration data stored in policies 34 and to perform other management-related functions. If the policy configuration data stored in policies 44 is not XML based, DMI 36 exports the data into an XML format. When receiving configuration updates from device management system 10, DMI 36 receives an XML formatted file with the configuration updates to be performed and then transforms the XML into a device-specific configuration.

Routing daemon 41 may represent a software module that updates routing information 50 to reflect a current topology of network 14. While described as a daemon or software module executed by routing engine 24, routing daemon 41 may be implemented as a hardware module or a combination of both hardware and software.

Packet processing module 37 comprises service daemon 47 and lookup module 48. Service daemon and lookup module 48 cooperate with other components of router 14 to process packets in the routing plane, including test packets received from packet analysis 38A. Service daemon 47 may represent a software module that routing engine 24 executes to facilitate communication with service plane 26. While described as a daemon or software module executed by routing engine 24, service daemon 47 may be implemented as a hardware module or a combination of both hardware and software. Lookup module 48 uses forwarding information 42 to determine the appropriate outbound interface for a packet in the routing plane. In some embodiments, lookup module 48 may perform certain tasks typically associated with the forwarding plane, such as modifying the TTL field for a packet in the routing plane.

In some embodiments, the functionality of lookup module 48 is distributed to forwarding plane 22. In such embodiments, forwarding engine 44 may include an injection interface by which routing engine 24 may pass packets and related data (e.g., an associated source interface) to forwarding engine 44. In one example, forwarding engine 44 receives a packet at the injection interface, modifies the received packet to indicate that the packet arrived in forwarding engine 44 from routing engine 24, and inserts the packet into network packets 46 for forwarding and service processing. In one example, forwarding engine 44 modifies a received TCP packet by setting a flag bit in the unused TCP reserved field. Forwarding engine 44, after processing a packet in conjunction with service engine 30, determines whether the packet arrived from routing engine 24 based on the prior modification, and, if so, returns the packet along with forwarding information (e.g., the outbound interface) for the packet to routing engine 24 via the injection interface.

Router 14 implements the techniques of the invention by supporting an extension of the NETCONF protocol that permits management devices, such as device management system 10, to inject packets directly into router 14. Specifically, DMI client 36 includes get-packet-analysis RPC 38A (hereinafter, "packet analysis 38A"), a NETCONF-based remote procedure call that exposes aspects of the packet processing functionality of router 14 to management devices.

Like other RPCs 38, packet analysis 38A receives parameters in an RPC request received from device management system 10 via a NETCONF session. In the case of packet analysis 38A, the parameters include a sequence of one or more test packets and an associated source interface identifier for the sequence. The sequence of test packets may correspond to a particular packet flow (e.g., a flow associated with a File Transfer Protocol (FTP) session). Packet analysis 38A cooperates with other components of router 14 in order to process the test packets as though router 14, rather than receiving the test packets via a remote procedure call exposed by DMI 36, received the test packets as an aspect of network packets 46. Packet analysis 38A then provides an account of the test packet processing, in the form of an RPC-reply, to device management system 10 for analysis.

Packet analysis 38A may receive the RPC request as an <rpc> element with an encapsulated parameter formulated according to an XML-schema for packet analysis 38A, e.g., the schema illustrated in FIG. 9. The following is an exemplary RPC request received by packet analysis 38A:

<rpc message-id="101"
   xmlns="urn:ietf:params:xml:ns:netconf:base:1.0">
   <get-packet-analysis>
   <packets>
      <packet>yZWFzb24sIGJ1dCBie</packet>
      <packet>W55IGNhcm</packet>
   </packets>
   <source-interface>ge-0/0/0.1</source-interface>
   </get-packet-analysis>
   </rpc>

In this example, the <rpc> element specifies the packet analysis 38A as in the intended one of RPCs 38 based on the <get-packet-analysis> element. The <get-packet-analysis> element includes a sequence of two test packets encoded in Base64 encoding and an identifier for an associated source interface of router 14. Packet analysis 38A may extract the test packet and associated source interface identifier from the <rpc> and <get-packet-analysis> elements for processing by router 14 components according to the process described below. Packet analysis 38A may decode the packet sequence from Base64 encoding to binary as an element of the extraction step. Test packets received from device management system 10 via packet analysis 38A are conceptualized and illustrated as packet stream 76 in both FIGS. 4 and 5.

Packet analysis 38A cooperates with other components of router 14 in order to process test packets received from device management system 10 as follows. After receiving an <rpc> element and extracting the test packets and associated source interface parameters from the element, packet analysis 38A conveys the parameters to service daemon 47, which sends the parameters to service engine 30.

Service engine 30 applies one or more of services 32 to the parameters in accordance with policies 34. That is, provided a condition of the test packets that is matched by a policy rule specified in policies 34, service engine 30 performs the corresponding action. For example, the exemplary policy rule provided above requires router 14 to drop packets originating from IP address 55.0.0.1. Applying this exemplary policy rule, service engine 30 drops the test packets where the test packet headers identify the packets as originating from IP address 55.0.0.1.

Service engine 30 returns the result of the application of services 32 to service daemon 47. The returned result may in some instances (e.g., dropped packets) be a null data set. In other instances, the returned result includes a sequence of one or more packets. In some embodiments, service engine 30 also returns associated forwarding data that specifies a manner in which the sequence is to be forwarded or that associates the packets with a service property. For example, service engine 30 may apply a routing policy that specifies a next hop for packets received at the source interface associated with the test packets. In another example, service engine 30 may apply a QoS policy that classifies packets meeting the policy condition to a particular forwarding equivalence class (FEC). In these instances, service engine 30 returns as associated forwarding data the next hop or the FEC, respectively, for the packets. In some embodiments, service engine 30 returns a list of the policy rules applied to the test packets.

Service daemon 47 receives the packets and, in some embodiments, the associated forwarding data and/or policy rules and conveys them to lookup module 48 for further processing. Lookup module 48 determines the appropriate outbound interface from forwarding information 42 based on the destination IP address of the packets received from service engine 30 and associates the outbound interface with the packets. In some embodiments, lookup module 48 may apply additional forwarding functions, including forwarding functions that may relate to the associated forwarding data received from service engine 30. For example, lookup module 48 may disregard the outbound interface specified by forwarding information 42 when the associated forwarding data stipulates that the packets are to be forwarded via another outbound interface. As another example, lookup module 48 may modify the TTL fields of the packets received from service engine 30.

Application of the policy rules and forwarding functions by service engine 30 and lookup module 48 results in a new sequence of zero or more result packets. The result packets represent the packets that router 14 would ordinarily forward, via the associated outbound interface, to a network device in response to receiving packets identical to the test packets. Lookup module 48 returns the result packets, as an aspect of packet stream 77, and an identifier for the associated outbound interface as a test packet processing result to packet analysis 38A. In some embodiments, lookup module 48 includes associated forwarding data and/or the policy rules applied to the test packets in the test packet processing result.

Packet analysis 38A may return the test packet processing result, i.e., the data received from lookup module 48, to device management system 10 via the established NETCONF session. Packet analysis 38A may first encode the result packets to Base64 encoding for transmission, then enclose the result packets, the associated outbound interface, and any additional data in the appropriate respective XML tags according to an XML-schema, such as the XML-schema illustrated in FIG. 10. The encoded XML data may be further enclosed in an <rpc-reply> tag that identifies the data as an RPC-reply for the packet analysis RPC called by device management system using the test packets as parameters. The following is an exemplary RPC-reply generated by packet analysis 38A:

<rpc-reply message-id="101"
    xmlns="urn:ietf:params:xml:ns:netconf:base:1.0">
    <packet-analysis-info>
    <packets>
        <packet>4sIGJ1dCBie</packet>
        <packet>yZWFzb2W55IGNhcm</packet>
    </packets>
    <outbound-interface>ge-0/0/0.2</source-interface>
    </packet-analysis-info>
    </rpc-reply>

Finally, packet analysis 38A sends, via DMI 36, the RPC-reply to device management system 10 for analysis.

By performing the techniques described above, router 14 leverages and enhances the NETCONF protocol so as to provide a mechanism by which device management system 10 may directly inject packets into router 14 in order to determine whether the device, as configured, meets the intended operational objectives. Rather than, for example, distributing agents throughout enterprise network 2 to generate packets and inject packets into the network for eventual delivery to router 14, device management system 10 may establish a NETCONF session with router 14 via DMI 36, configure router 14, and send test packets to the router 14 in a NETCONF-based RPC while also specifying a source interface for the test packets so as to verify the configuration. Router 14, in turn, implements a parallel processing path for the test packets that mirrors the standard processing path for ordinary packets received at the interfaces. As a result, router 14 first processes the test packets in such a manner to produce result packets identical to those that would have been produced by the standard processing path if the packets were received "live" from the network and then returns the result packets and associated analysis data to device management system 10 as an RPC-reply via the NETCONF session. This request-reply technique allows an administrator to remotely validate configuration data (e.g., policies) on router 14 by comparing an expected result with an actual result (i.e., the result packets and associated analysis data). In addition, the techniques may simplify device testing and allow device management to be consolidated into device management system 10. For example, while injecting packets into a computer network frequently requires a device manager to have knowledge of interfaces and other network device attributes distributed throughout the network in order to inject network packets into the network, device management system 10 injects packets into the network devices, which allows device management system 10 to leverage the knowledge (e.g., forwarding information, routing information, Ethernet addresses, etc.) contained in the network devices in order to validate policies and other configuration data. Furthermore, conventional mechanisms for remotely injecting network packets into a network at different locations in the network require procurement of an expensive testbed architecture that may not be necessary when using device management system 10 according to the techniques described. The techniques may also improve analysis efficiency by consolidating, for particular test packets, the analysis data received from router 14 in an RPC-reply. Finally, an administrator may use the techniques described to send various network attacks to a network device and then use the responsive result packets as a means to understand the behavior of the network device when it is attacked.

Figure 6:
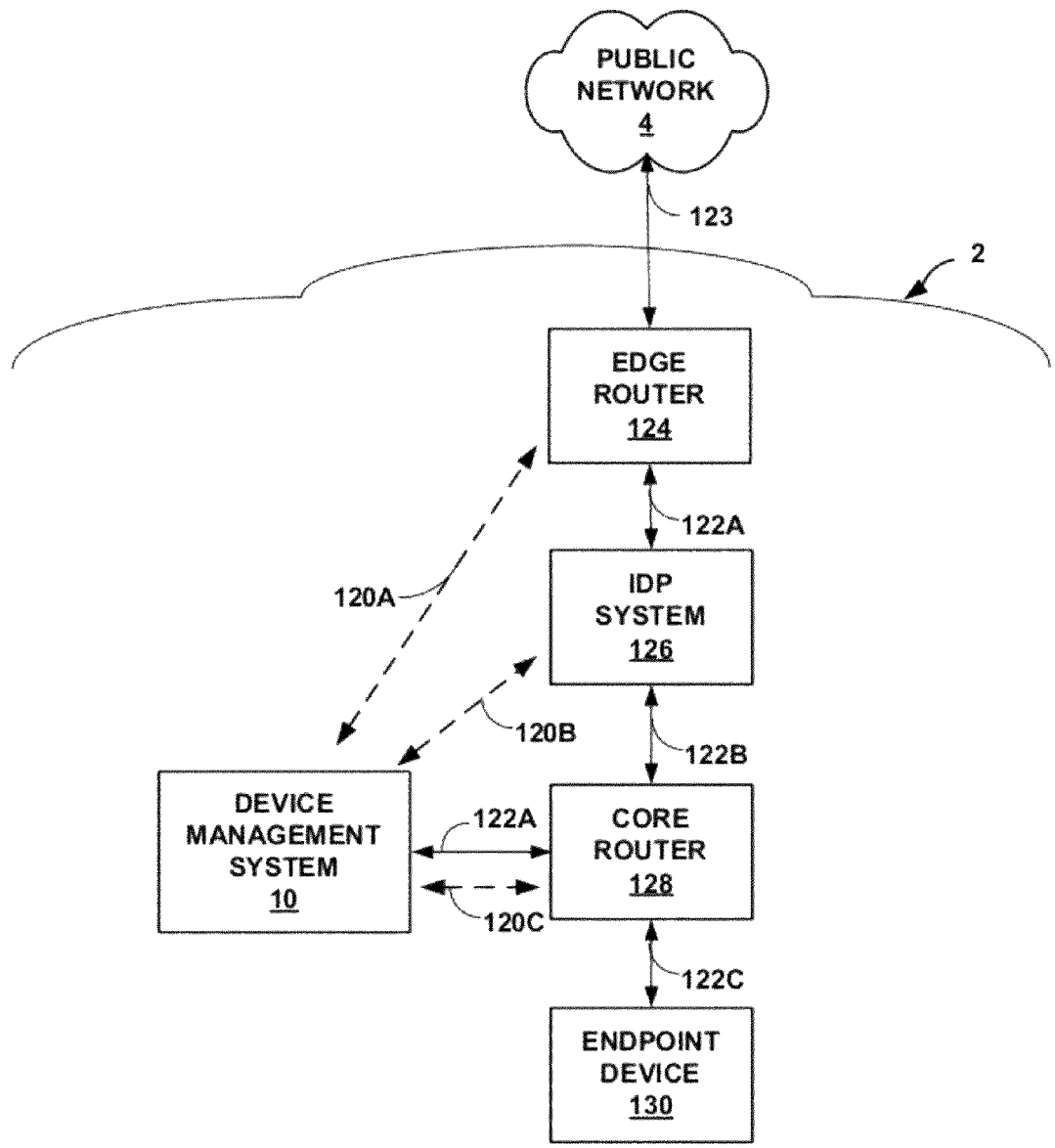
FIG. 6 is a block diagram that illustrates a series of elements in a network and a device management system that performs a network diagnostic technique described in this disclosure.

FIG. 6 is a block diagram that illustrates a subset of enterprise network 2 of FIG. 1. The subset illustrated includes device management system 10, as well as edge router 124, intrusion detection and prevention (IDP) system 126 ("IDP system 126"), core router 128, and endpoint device 130, which may represent elements 5A-5D, respectively, of enterprise network 2. The illustrated network devices are communicatively coupled via communication links 122A-122C. Edge router 124 is deployed at the edge of enterprise network 2 to provide connectivity between enterprise network 2 and public network 4 via communication link 123. IDP system 126 examines network traffic and monitors the elements 5 of enterprise network 2 to detect and/or prevent, for instance, network attacks, unauthorized access to any of elements 5, and malware intrusions, such as viruses, worms, and trojans. Core router 128 may connect multiple enterprise local area networks (LANs) of enterprise network 2. Endpoint device 130 accesses resources provided by enterprise network 2 and/or provides resources to other network devices of enterprise network 2. Endpoint device 130 may be, for example, a personal computer, a laptop computer, a mobile telephone, a network telephone, a television set-top box, a point-of-sale device, a personal digital assistant, a file server, a web server, a network appliance, a supercomputer, a mainframe computer, or another type of device capable of interfacing with and communicating over enterprise network 2.

Device management system 10, edge router 124, IDP system 126, and core router 128 implement the techniques of the invention to enable a network diagnostic method whereby device management system 10 may identify a network device that is improperly obstructing certain network traffic along a forwarding path. Device management system 10 uses the packet analysis RPC exposed by each of edge router 124, IDP system 126, and core router 128 to remotely inject one or more test packets into the network device and receive zero or more result packets in response. Device management system 10 determines whether the result packets indicate that the network device is an obstruction and, if not, sends the result packets as test packets to the next network device in the forwarding path, which responds with additional result packets that may be used as test packets for the next device in the forwarding path, and so on. In some embodiments, result packets are accompanied by identifiers for the policy rules as that allows device management system 10, after identifying the obstructing device, to determine the particular policy rule of the obstructing device that is causing the obstruction.

For example, endpoint device 130 may attempt to access resources of public network 4, such as an FTP server of public network 4. However, one or more of edge router 124, IDP system 126, and core router 128 may be presently configured so as to obstruct the establishment of an FTP session for endpoint device 130 involving public network 4.

Device management system 10 uses the policy validation techniques described above to generate test packets that simulate aspects of the FTP session and remotely inject the test packets into the network devices in order to identify the obstruction. For example, device management system 10 may simulate an upstream FTP session request sent by endpoint device 130 to public network 4. Device management system 10 first generates the test packets that simulate the request then establishes NETCONF session 120C with core router 128. Using the NETCONF session, device management system 10 calls the packet analysis RPC exposed by core router 128 to remotely inject the test packet into core router 128. Core router 128, in turn, responds with result packets encapsulated in an RPC-reply. If core router 128 responds with improper or empty result packets, device management system 10 identifies core router 128 as the obstruction and an administrator may elect to perform ameliorative policy configuration updates to core router 128 in order to enable the FTP session initiation. In some embodiments, the RPC-reply may include an identification of the policy rule that caused core router 128 to return improper or empty packets, which further aids the administrator in determining an appropriate policy configuration update for core router 128. If, on the other hand, core router 128 returns result packets in an RPC-reply that indicate that core router 128 is properly forwarding the FTP session request, device management system 10 next analyzes IDP system 126, the next device on the forwarding path.

To determine whether IDP system 126 is obstructing the FTP session request, device management system 10 establishes NETCONF session 120B with IDP system 126. Because the result packets received from core router 128 represent the packets that core router 128 would ordinarily send to IDP system 126, device management system 10 remotely injects these result packets into IDP system 126 using the packet analysis RPC exposed by IDP system 126. IDP system 126 responds with additional result packets in an RPC-reply, which device management system 10 analyzes to determine whether IDP system 126 is obstructing the FTP session request. Device management system 10 may perform a similar analysis of edge router 124 using the result packets received from IDP system 126. By performing the techniques of the invention in this manner, device management system 10, edge router 124, IDP system 126, and core router 128 provide an effective network diagnostic tool.

Figure 7:
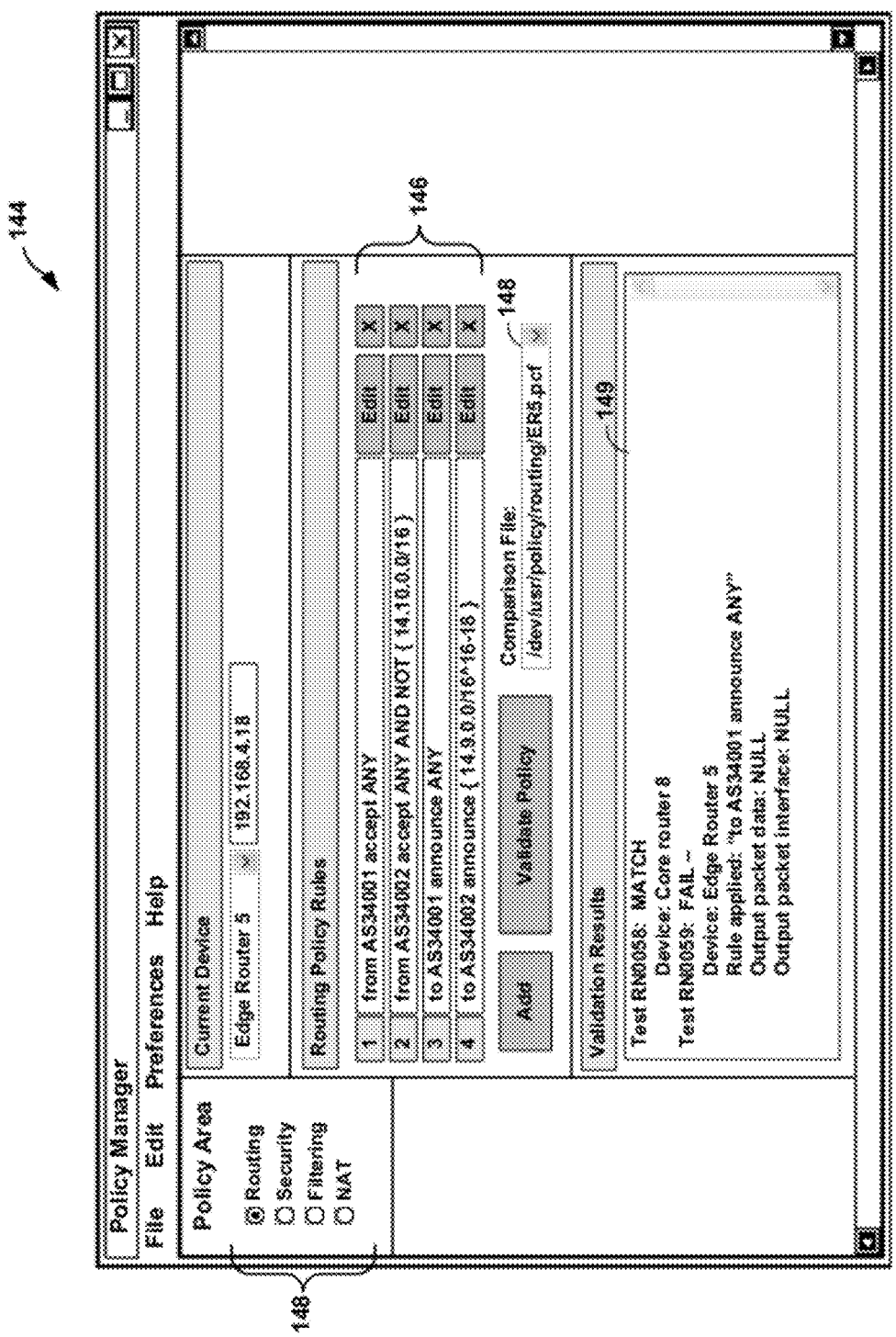
FIG. 7 is an exemplary screenshot of a policy manager application running on a device management system.
Figure 8:
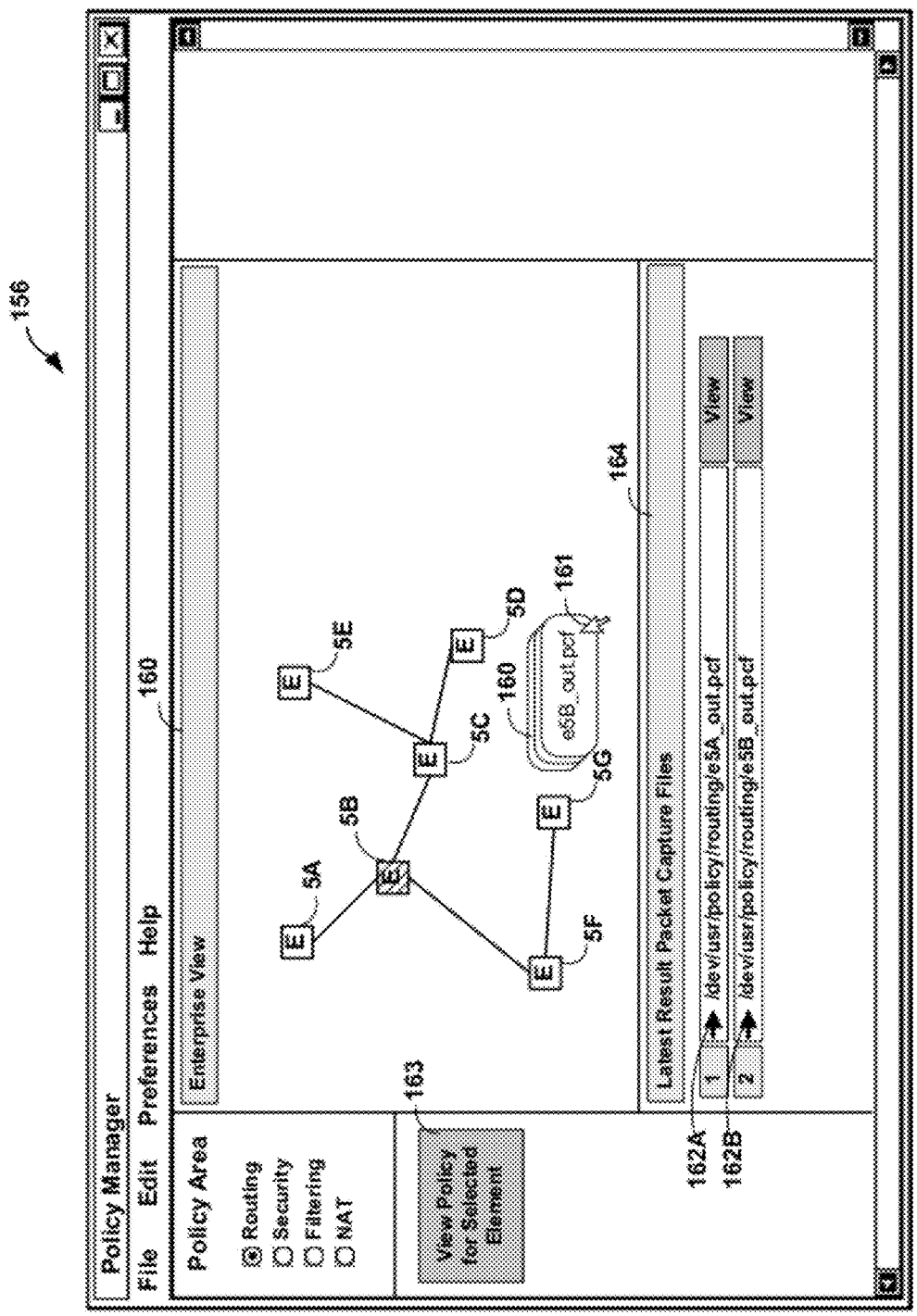
FIG. 8 is an exemplary screenshot illustrating another aspect of the policy manager application for managing an enterprise network using a topographical representation of the network.

FIG. 7 illustrates an exemplary screenshot 144 for user interface 80 of element manager 90 of the device management system 10 of FIG. 3. User interface 80 presents policy rules according to categories 148. Screenshot 144 illustrates a number of routing policy rules 146 showing routing policies currently configured on the current device being managed. User interface 80 implements the techniques of the invention by providing an administrator with the capability to validate a policy using the packet analysis RPC described herein. For example, element manager 90 may compare the results of a RPC-based policy validation operation with a packet capture file selected with comparison file textbox 148, and then output the results of the policy validation comparison to an administrator in display textbox 149. The screenshot of embodiment of user interface 80 illustrated in FIG. 8 is merely exemplary. User interface 80 may include additional interface mechanisms to allow an administrator to use the techniques of the invention.

FIG. 8 illustrates an additional exemplary screenshot 156 for user interface 80 of element manager 90 of the device management system 10 of FIG. 3. User interface 80 includes an enterprise view 160 that displays a topological representation of elements 5 of enterprise network 2. An administrator may select one of elements 5 for analysis using mouse pointer 161. In the exemplary screenshot 156, element 5B is selected. After selecting one of elements 5, an administrator may view the policy for the selected element by pressing policy view button 163. Window 164 provides a list of the latest result packet capture files received in RPC-replies from one or more of elements 5 in response to packet analysis RPC invocations on those elements 5 by device management system 10.

As illustrated in screenshot 156, user interface 80 provides a mechanism for performing a network diagnostic according to the techniques of this invention. An administrator may drag one of file references 162A-162B to one of elements 5 illustrated in enterprise view. For example, screenshot 156 illustrates an administrator dragging a file representation 160 from reference link 162B, which references a result packet capture file comprising result packets received from element 5B, to element 5C. Once the drag operation is complete (i.e., the administrator releases file 160 on element 5C), element manager 90 invokes the packet analysis RPC on element 5C and provides the result packets in the file at file reference 162B as test packet parameters. Element 5C performs the packet analysis RPC operations and returns an additional set of result packets in an RPC-reply. Administrator may, in turn, analyze the additional set of result packets to determine whether element 5C is properly configured. In this manner, an administrator may analyze multiple elements 5 along a forwarding path to determine whether any of the elements 5 are configured as to improperly obstruct certain network traffic along the forwarding path.

FIG. 9 illustrates an exemplary XML-schema 156 that defines the name and parameters for a <get-packet-analysis> element that specifies the invocation of packet analysis 38A of router 14, illustrated in FIG. 5, by a device manager. In accordance with the techniques of the invention, XML-schema 156 specifies a <get-packet-analysis> element/type that comprises two parameters: a packet sequence and a source interface associated with the packet sequence. Packet analysis 38A may receive well-formed XML data according to XML-schema 156 via a NETCONF session with a device manager, then extract the parameters and convey the parameters to other router 14 components for processing.

FIG. 10 illustrates an exemplary XML-schema 158 that define the name and parameters for a <packet-analysis-info> element that is included in an RPC-reply from packet analysis 38A of router 14, illustrated FIG. 5, to a device manager that invoked packet analysis 38A, such as device management system 10. In accordance with the techniques of the invention, XML-schema 158 specifies a <packet-analysis-info> element/type that comprises two parameters: a sequence of zero or more result packets and an outbound interface ("outgoing-interface"). In some embodiments, XML-schema may include additional elements for additional forwarding data associated with the result packet and for identifying policy rules applied to the test packets. Packet analysis 38A responds to an invocation by conveying the RPC parameters to other router 14 components for processing, receiving the resulting data, then converting the resulting data to well-formed XML data according to XML-schema 158 and transmitting the XML data to the calling device via a NETCONF session.

Figure 11:
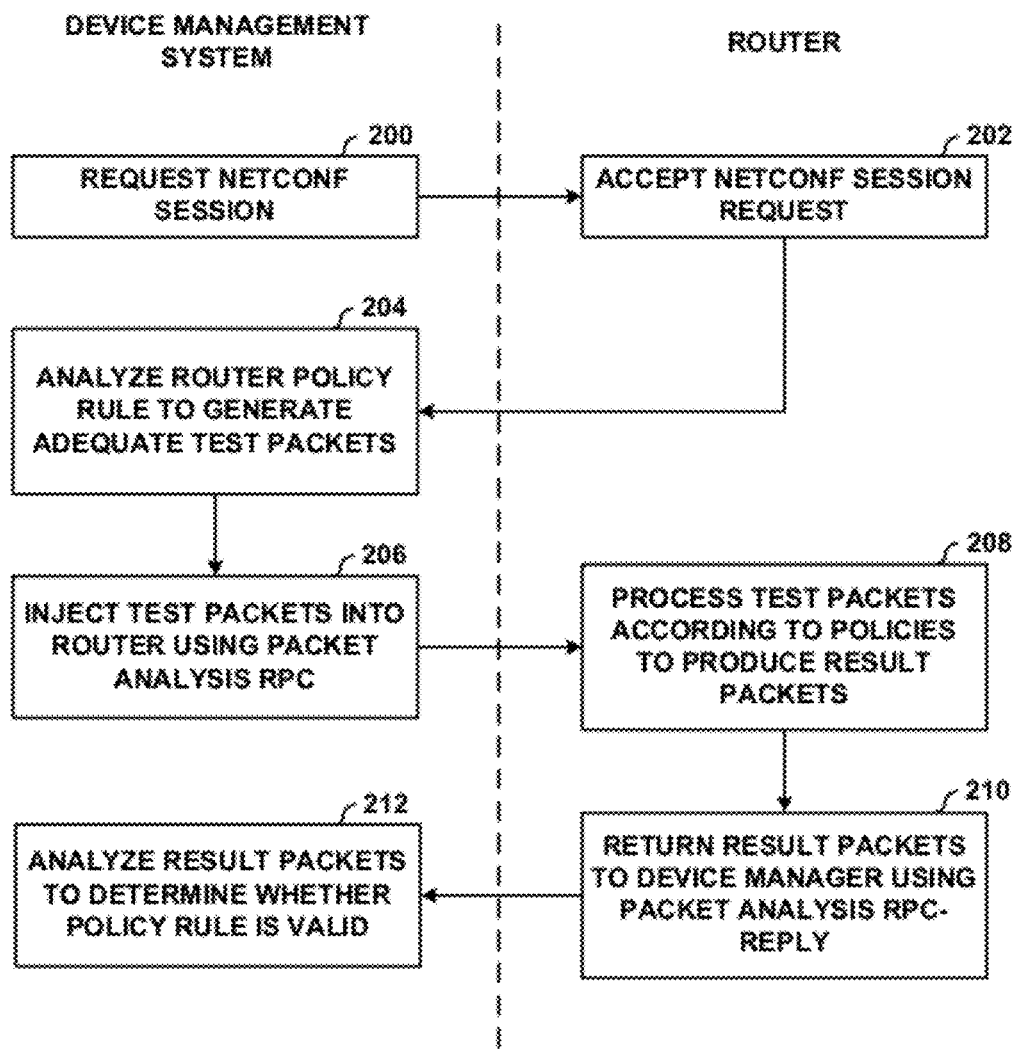
FIG. 11 is a flowchart illustrating a network diagnostic method that utilizes the techniques described herein.

FIG. 11 is a flowchart illustrating an example method for remotely injecting packets into a network device in accordance with the techniques of the invention. For purposes of explanation, the method is described with respect to device management system 10 and router 14 of FIG. 5. Device management system 10 and router 14 initially establish a NETCONF session or other device management session in order to realize an RPC layer of communication in accordance with a device management protocol. Device management system 10 sends a NETCONF session request to router 14 (200), which accepts the request to establish the NETCONF session (202).

Device management system 10 maintains configuration data, which may include one or more policy rules, that have been already been deployed to router 14 via the NETCONF protocol. To validate a deployed policy rule, device management system 10 analyzes the policy rule to determine condition attributes and then generates test packets having those attributes so as to adequately test the policy rule (204). Device management system 10 then calls NETCONF-based packet analysis RPC exposed by router 14 as described herein using test packets as parameters (206).

Router 14 extracts the test packets from the RPC and processes the test packets according to its policy configuration data to produce zero or more result packets (208). Router 14 encapsulates the result packets in an RPC-reply for the packet analysis RPC and returns the RPC-reply to device management system 10 (210). Device management system 10 receives the RPC-reply, extracts the result packets, and determines whether the policy rule being tested meets the operational objectives for router 14 based on an analysis of the result packets.

The techniques described in this disclosure may be implemented, at least in part, in hardware, software, firmware or any combination thereof on the device management system and the managed devices. For example, various aspects of the described techniques may be implemented as encoded program code executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A network device comprising:
a control unit;
a network interface configured to receive and send network packets;
a device management software interface executing on the control unit of the network device to receive configuration data in accordance with a device management protocol and to update configuration data of the network device,
wherein the device management software interface is configured to expose a device configuration function of the device management protocol that receives a test packet encapsulated as a first parameter of the device configuration function, wherein the test packet simulates one or more of the network packets;
a packet processing module that extracts the test packet from the device configuration function and processes the test packet to produce a test packet processing result in accordance with the configuration data of the network device as if the test packet had been directly received from a network,
wherein the device management software interface is configured to send the test packet processing result as a first parameter of a reply message in accordance with the device management protocol.

2. The network device of claim 1,
wherein the packet processing module processes packets received from the network interface and the device management software interface to produce an output packet,
wherein the device management software interface is configured to flag the test packet received as the first parameter of the device configuration function, and
wherein the packet processing module is configured to determine whether a packet is a test packet or a network packet based on the flag and, when the packet is a test packet, to send the output packet to the device management software interface, and, when the packet is a network packet, to send the output packet to the network interface.

3. The network device of claim 1,
wherein the device configuration function receives a source interface identifier encapsulated as a second parameter of the device configuration function,
wherein the source interface identifier identifies a source interface of the network device,
wherein the packet processing module processes the test packet to produce a test packet processing result comprising a result packet in accordance with the configuration data of the network device as if the test packet had been directly received from the network at the source interface instead of the device management software interface,
wherein the packet processing module further determines an outbound interface of the network device for the result packet, and
wherein the packet processing module produces the test packet processing result to specify the determined outbound interface of the network device and the result packet.

4. The network device of claim 1, further comprising:
a policy module comprising a policy rule,
wherein the packet processing module applies the policy rule to the test packet, and
wherein the test packet processing result comprises an identifier for the policy rule.

5. The network device of claim 1,
wherein the device management protocol is a NETCONF protocol,
wherein the exposed device configuration function is a NETCONF-based remote procedure call (RPC), and
wherein the reply message is an RPC-reply for the RPC.

6. The network device of claim 5,
wherein the RPC receives XML data that conforms to an XML schema as the first parameter for the device configuration function, and
wherein the test packet is encapsulated as an XML element of the XML data.

7. A network management device comprising:
a network interface configured to receive and send network packets;
an element manager configured to send configuration data to a managed network device in accordance with a device management protocol;
a device management software interface client configured to implement the device management protocol and to call a device configuration function exposed by the managed network device that receives a test packet encapsulated as a first parameter of the device configuration function, wherein the test packet simulates one or more of the network packets,
wherein the element manager includes a validation module that invokes the device configuration function using a test packet as a first parameter.

8. The network management device of claim 7, further comprising:
a device policies module comprising a policy rule for a network device,
wherein the validation module is configured to determine one or more packet attributes that match a condition of the policy rule and to generate the test packet based on the one or more packet attributes.

9. The network management device of claim 8, wherein the validation module comprises:
an Extensible Stylesheet Language Transformations (XSLT) stylesheet configured to transform the policy rule to XML data that specifies the one or more packet attributes according to an XML schema; and
a packet generator configured to extract the one or more packet attributes from the XML data and to generate the test packet based on the one or more packet attributes.

10. The network management device of claim 7, wherein the test packet includes a signature of a network attack.

11. The network management device of claim 7, wherein the validation module comprises a packet capture file to store packets, and wherein the validation module is further configured to store the test packet in the packet capture file.

12. The network management device of claim 11, further comprising:
a device policies module comprising a policy rule for the network device; and
a user interface configured to accept commands from an administrator that change the policy rule,
wherein the validation module is configured to invoke the device configuration function using the test packet as the first parameter in response to a change to the policy rule.

13. The network management device of claim 7, wherein the validation module is configured to receive a reply message comprising a test packet processing result from the managed network device in response to invoking the device configuration function using the test packet as the first parameter, and wherein the validation module is further configured to determine whether the test packet processing result indicates that the network device is properly configured.

14. The network management device of claim 13, further comprising:
a device policies module comprising a policy rule for a network device,
wherein the validation module comprises a packet capture file to store packets and is further configured to:
store the test packet processing result in the packet capture file;
in response to a change to the policy rule, invoke the device configuration function to receive a reply message comprising a second test packet processing result; and
determine whether the second test packet processing result indicates that the network device is properly configured by comparing the second test packet processing result to the test packet processing result stored in the packet capture file.

15. The network management device of claim 7, wherein the validation module invokes the device configuration function using a source interface identifier as a second parameter of the device configuration function, wherein the source interface identifier identifies a network interface of the managed network device.

16. The network management device of claim 7,
wherein the device management protocol is a NETCONF protocol,
wherein the device configuration function exposed by the managed network device is a NETCONF-based remote procedure call (RPC).

17. A system comprising:
a network management device comprising:
a first network interface configured to receive and send network packets;

an element manager configured to send configuration data to a managed network device in accordance with a device management protocol;

a device management software interface client configured to implement the device management protocol and to call a device configuration function of the device management protocol exposed by the managed network device that receives a test packet encapsulated as a first parameter of the device configuration function, wherein the test packet simulates one or more of the network packets, wherein the element manager includes a validation module that generates a test packet and invokes the device configuration function using the test packet as a first parameter; and a network device managed by the network management device, comprising:

a control unit;

a second network interface configured to receive and send network packets;

a device management software interface executing on the control unit of the network device to receive configuration data in accordance with the device management protocol and to update configuration data of the network device, wherein the device management software interface is configured to implement the device management protocol and to expose the device configuration function of the device management protocol called by the network management device;

a packet processing module that extracts the test packet from the device configuration function and processes the test packet to produce a test packet processing result in accordance with the configuration data of the network device as if the test packet had been directly received from the network, and wherein the device management software interface is configured to send the test packet processing result as a first parameter of a reply message in accordance with the device management protocol, wherein the validation module of the network management device is further configured to determine whether the test packet processing result indicates that the network device is properly configured.

18. A method comprising:

invoking a first device configuration function, exposed by a first network device, that receives a first test packet as a parameter, wherein the first test packet simulates a network packet that may be received at a network interface of the first network device;

receiving a first reply message comprising a first result packet in response to invoking the first device configuration function; and determining whether the first network device is properly configured based on the first result packet.

19. The method of claim 18, further comprising:

determining one or more packet attributes that match a condition of a policy rule for the first network device; and generating the test packet based on the one or more packet attributes.

20. The method of claim 18, further comprising:

invoking a second device configuration function, exposed by a second network device, that receives a second test packet as a parameter, wherein the second test packet simulates a network packet that may be received at a network interface of the first network device, and wherein the second test packet is the first result packet;

receiving a second reply message comprising a second result packet in response to invoking the second device configuration function; and determining whether the second network device is properly configured based on the second result packet.

* * * * *